United States Patent
Lim et al.

(10) Patent No.: US 10,779,264 B2
(45) Date of Patent: Sep. 15, 2020

(54) METHOD FOR TRANSMITTING WIRELESS FRAME INCLUDING MULTIPLE SIGNALING FIELDS, AND DEVICE THEREFOR

(71) Applicant: LG ELECTRONICS INC., Seoul (KR)

(72) Inventors: Dongguk Lim, Seoul (KR); Jinsoo Choi, Seoul (KR); Hangyu Cho, Seoul (KR); Eunsung Park, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 15/571,797

(22) PCT Filed: Mar. 14, 2016

(86) PCT No.: PCT/KR2016/002505
§ 371 (c)(1),
(2) Date: Nov. 3, 2017

(87) PCT Pub. No.: WO2016/178474
PCT Pub. Date: Nov. 10, 2016

(65) Prior Publication Data
US 2019/0124638 A1    Apr. 25, 2019

Related U.S. Application Data

(60) Provisional application No. 62/157,481, filed on May 6, 2015, provisional application No. 62/158,514, filed on May 7, 2015.

(51) Int. Cl.
*H04W 72/04*    (2009.01)
*H04L 1/00*    (2006.01)
(Continued)

(52) U.S. Cl.
CPC ....... *H04W 72/0406* (2013.01); *H04L 1/0031* (2013.01); *H04L 1/0061* (2013.01);
(Continued)

(58) Field of Classification Search
CPC .. H04W 72/0406; H04W 84/12; H04L 1/0002
See application file for complete search history.

(56) References Cited

U.S. PATENT DOCUMENTS

2013/0208715 A1\* 8/2013 Roh ............... H04L 1/0025
370/338
2013/0315262 A1\* 11/2013 Baik ............... H04L 27/2602
370/474
(Continued)

FOREIGN PATENT DOCUMENTS

WO    2011068387    6/2011
WO    2011108832    9/2011
(Continued)

OTHER PUBLICATIONS

PCT International Application No. PCT/KR2016/002505, Written Opinion of the International Searching Authority dated Jul. 11, 2016, 21 pages.

*Primary Examiner* — Jenee Holland
(74) *Attorney, Agent, or Firm* — Lee, Hong, Degerman, Kang & Waimey PC

(57) ABSTRACT

According to one embodiment of the present invention, an AP generates a frame including a signaling field and a data field so as to transmit the frame to one or more STAs, wherein: the signaling field includes a first signaling field having first common control information on the one or more STAs, and a second signaling field having individual control information for each of the one or more STAs; and the second signaling field includes a common field having second common control information on the one or more STAs, and individual fields having individual control infor-
(Continued)

mation for each of the one or more STAs. In addition, if the frame is transmitted with a bandwidth of 40 MHz or more, the second signaling field transmits independent control information in two adjacent 20 MHz bands.

10 Claims, 20 Drawing Sheets

(51) Int. Cl.
*H04L 27/26* (2006.01)
*H04W 84/12* (2009.01)

(52) U.S. Cl.
CPC ........ *H04L 1/0083* (2013.01); *H04L 27/2602* (2013.01); *H04L 1/0002* (2013.01); *H04L 1/0003* (2013.01); *H04W 84/12* (2013.01)

(56) References Cited

U.S. PATENT DOCUMENTS

| | | | |
|---|---|---|---|
| 2014/0119327 A1* | 5/2014 | Oh | H04B 7/0452 |
| | | | 370/329 |
| 2014/0286226 A1 | 9/2014 | Seok et al. | |
| 2014/0362818 A1* | 12/2014 | Onggosanusi | H04B 1/1615 |
| | | | 370/329 |
| 2015/0139118 A1* | 5/2015 | Azizi | H04L 5/0035 |
| | | | 370/329 |
| 2016/0248569 A1* | 8/2016 | Ghosh | H04L 1/1614 |
| 2016/0262050 A1* | 9/2016 | Merlin | H04L 5/0053 |
| 2016/0295559 A1* | 10/2016 | Bharadwaj | H04W 72/1273 |
| 2017/0048862 A1* | 2/2017 | Choi | H04L 5/0053 |
| 2018/0007712 A1* | 1/2018 | Lou | H04B 7/0452 |
| 2019/0289589 A1* | 9/2019 | Lim | H04B 7/26 |

FOREIGN PATENT DOCUMENTS

| | | |
|---|---|---|
| WO | 2012057546 | 5/2012 |
| WO | 2014171788 | 10/2014 |

* cited by examiner

| VHT =0 | Link Adaptation Control | Calibration Position | Calibration Sequence | Reserved | CSI/Steering | NDP Announcement | Reserved | AC Constraint | RDG/ More PPDU |
|---|---|---|---|---|---|---|---|---|---|
| B1 | B15 B16 | B17 B18 | B19 B20 | B21 B22 | B23 B24 | B25 | B29 B30 | | B31 |
| Bits: 1 | 15 | 2 | 2 | 2 | 2 | 1 | 5 | 1 | 1 |

(a)

| TRQ | MAI | MFSI | MFB/ASELC |
|---|---|---|---|
| B1 | B2 B5 | B6 B8 | B9 B15 |
| 1 | 4 | 3 | 7 |

| | B1 | B2 | B3 B5 | B6 B8 | B9 B23 | B24 B26 | B27 | B28 | B29 | B30 | B31 |
|---|---|---|---|---|---|---|---|---|---|---|---|
| VHT=1 | Reserved | MRQ | MSI | MFSI/ GID-L | MFB | GID-H | Coding Type | FB Tx Type | Unsoli cited MFB | AC Constraint | RDG/ More PPD U |
| Bits: 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

(b)

| Frame Control | A1 | A2 | Sequence Control | A3 | A4 | Frame Body | FCS |
|---|---|---|---|---|---|---|---|
| Octets: 2 | 2 or 6 | 6 or 2 | 0 or 2 | 0 or 6 | 0 or 6 | variable | 4 |

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragm ents | Power Manage ents | More Data | Protected Frame | End of Service Period | Relayed Frame | Ack Policy |
| Bits: 2 | 3 | 3 | 1 | 1 | 1 | 1 | 1 | 1 | 1 | 1 |

(b)

METHOD FOR TRANSMITTING WIRELESS FRAME INCLUDING MULTIPLE SIGNALING FIELDS, AND DEVICE THEREFOR

CROSS-REFERENCE TO RELATED APPLICATIONS

This application is the National Stage filing under 35 U.S.C. 371 of International Application No. PCT/KR2016/002505, filed on Mar. 14, 2016, which claims the benefit of U.S. Provisional Application Nos. 62/157,481, filed on May 6, 2015 and 62/158,514, filed on May 7, 2015, the contents of which are all hereby incorporated by reference herein in their entirety.

TECHNICAL FIELD

The present invention relates to a wireless LAN system, and more particularly, a method and device for configuring a radio frame including various signaling fields and effectively transmitting the radio frame in a wireless LAN system.

BACKGROUND ART

While a proposed frame transmission method as set forth below is applicable to various types of wireless communication, the frame transmission method will be described below in the context of a WLAN system as an example of a system to which the present invention is applicable.

Standards for a WLAN technology have been developed as Institute of Electrical and Electronics Engineers (IEEE) 802.11 standards. IEEE 802.11a and 802.11b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output-OFDM (MIMO-OFDM). IEEE 802.11n supports a channel bandwidth of up to 40 MHz and, in this case, provides a transmission rate of 600 Mbps.

The above-described WLAN standards have evolved into IEEE 802.11ac that supports a transmission rate of up to 1 Gbit/s by using a bandwidth of up to 160 MHz and supporting eight spatial streams, and IEEE 802.11ax standardization is under discussion.

DISCLOSURE

Technical Problem

An object of the present invention devised to solve the problem lies in a method of effectively transmitting and receiving data using an effective wireless frame structure in a wireless LAN system.

The present invention is not limited to the above object, and other objects of the present invention will be apparent from the embodiments of the present invention.

Technical Solution

The object of the present invention can be achieved by providing a method of transmitting a radio frame to one or more stations (STAs) by an access point (AP) in a wireless LAN system, the method including generating, by the AP, a frame including a signaling field and a data field, wherein the signaling field includes a first signaling field (SIG A field) comprising first common control information of the one or more STAs and a second signaling field (SIG B field) comprising individual control information of each of the one or more STAs, wherein the second signaling field includes a common field comprising second common control information of the one or more STAs and an individual field comprising the individual control information of the one or more STAs and transmitting the frame to the one or more STAs, wherein, when the frame is transmitted in a bandwidth of 40 MHz or more, the second signaling field transmits control information that is independent for two 20 MHz bands adjacent to each other.

The individual field of the second signaling field transmitted in a specific 20 MHz band of the two 20 MHz bands may comprise a padding bit after cyclic redundancy check (CRC) of the individual control information and a tail bit.

When the one or more STAs may include a plurality of STAs, the individual field of the second signaling field may comprise information encoded by grouping information for two or more STAs of the plurality of STAs. In this case, the information for the two or more STAs may comprise cyclic redundancy check (CRC) in units of the grouping.

The grouping for encoding may be performed in consideration of modulation and coding scheme (MCS) of each of the plurality of STAs and, in detail, the individual field of the second signaling field may be configured by grouping and encoding STAs with a same MCS among the plurality of STAs.

When the frame is transmitted in a bandwidth of 80 MHz or more, the second signaling field may be transmitted using one or more of a scheme of transmitting control information that is independent for two 20 MHz bands adjacent to each other and a scheme of transmitting control information that is same for two 20 MHz bands.

When the frame is transmitted in a bandwidth of 80 MHz or more, the second signaling field may transmit control information that is independent for a first 20 MHz band and a second 20 MHz band within a first 40 MHz band, and a second 40 MHz band may transmit same control information as the first 40 MHz band.

In another aspect of the present invention, provided herein is an access point (AP) apparatus for transmitting a radio frame to one or more stations (STAs) in a wireless LAN system, the AP apparatus including a processor configured to generate a frame including a signaling field and a data field and a transceiver connected to the processor and configured to transmit the frame to the one or more STAs, wherein the processor configures the signaling field to include a first signaling field (SIG A field) comprising first common control information of the one or more STAs and a second signaling field (SIG B field) comprising individual control information of each of the one or more STAs, configures the second signaling field to include a common field comprising second common control information of the one or more STAs and an individual field comprising the individual control information of the one or more STAs, and controls the transceiver to transmit control information that is independent for two adjacent 20 MHz bands of the second signaling field when the frame is transmitted in a bandwidth of 40 MHz or more.

The processor may configure the individual field of the second signaling field transmitted in a specific 20 MHz band of the two adjacent 20 MHz bandwidths to include a padding bit after cyclic redundancy check (CRC) of the individual control information and a tail bit.

The one or more STAs may include a plurality of STAs and the processor may configure the individual field of the second signaling field to include information encoded by grouping information for two or more STAs of the plurality of STAs.

The information for the two or more STAs may include cyclic redundancy check (CRC) in units of grouping.

When the frame is transmitted in a bandwidth of 80 MHz or more, the frame is transmitted in a bandwidth of 80 MHz or more, the processor may configure the second signaling field to be transmitted using one or more of a scheme of transmitting control information that is independent for two adjacent 20 MHz bands and a scheme of transmitting same control information for two adjacent 20 MHz bands.

In detail, when the frame is transmitted in a bandwidth of 80 MHz or more, the processor may configure the second signaling field to transmit control information that is independent for a first 20 MHz band and a second 20 MHz band within a first 40 MHz band, and may configure a second 40 MHz band to transmit same control information as the first 40 MHz band.

Advantageous Effects

According to an embodiment of the present invention, when a frame including a multiple signaling field is transmitted through a broadband, independent control information may be contained in each band to flexibly transmit a signal.

Positions of padding bits for matching time domain alignment according to independent control information transmission may be determined and a decoding time of stations (STAs) for receiving a frame may be reduced.

In addition, an encoding unit of an individual information field of a signaling field may be effectively designed to minimize signaling overhead.

The effects of the present invention are not limited to the above-described effects and other effects which are not described herein will be understood by those skilled in the art from the following description of the embodiments of the present invention.

DESCRIPTION OF DRAWINGS

FIGS. 9 to 13 are views illustrating exemplary frame structures in an Institute of Electrical and Electronics Engineers (IEEE) 802.11 system.

FIGS. 14, 15, and 16 are views illustrating a Medium Access Control (MAC) frame format.

BEST MODE

Figure 1:
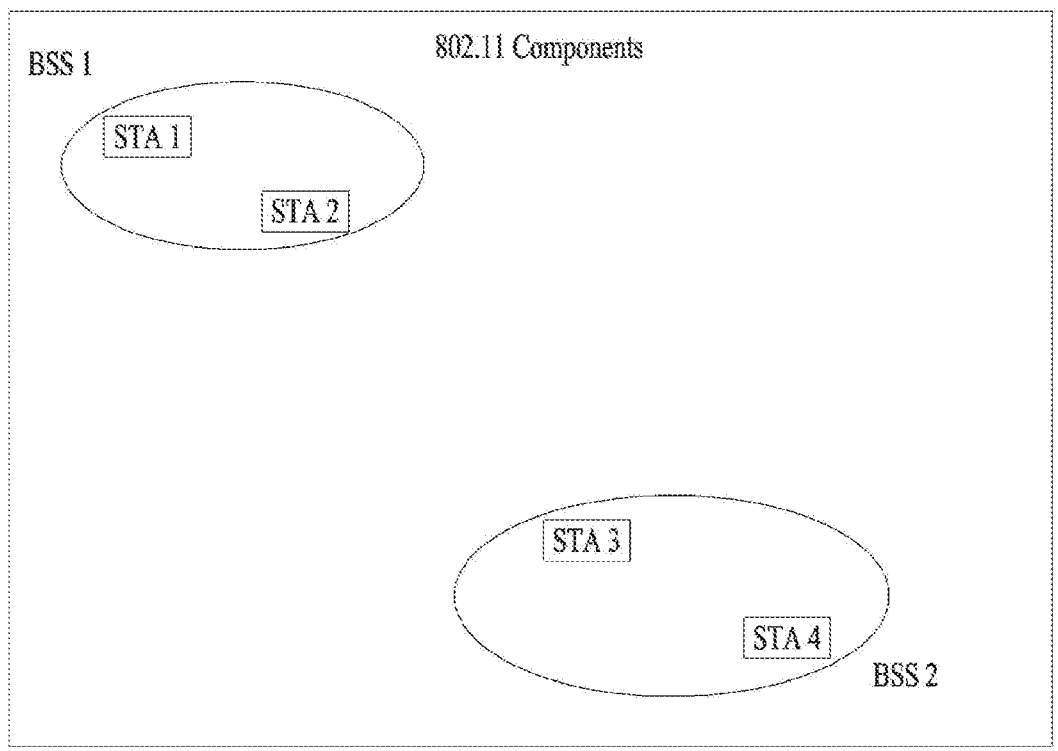
FIG. 1 is a view illustrating an exemplary configuration of a Wireless Local Area Network (WLAN) system.

Reference will now be made in detail to preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be changed. Some constructions or elements of any embodiment may be included in another embodiment, or may be replaced with corresponding constructions or features of another embodiment.

Specific terms as used in the following description are provided to help understanding of the present invention, and these specific terms may be replaced with other terms within the scope and spirit of the present invention.

In some instances, known structures and devices are omitted or are shown in block diagram form, focusing on important features of the structures and devices, so as not to obscure the concept of the present invention. Like reference numerals denote the same components throughout the present disclosure.

The embodiments of the present invention may be supported by standard specifications disclosed for at least one of wireless access systems including an Institute of Electrical and Electronics Engineers (IEEE) 802 system, a 3rd Generation Partnership Project (3GPP) system, a 3GPP Long Term Evolution (LTE) system, and a 3GPP2 system. In other words, the steps or parts, which are not described to clearly reveal the technical idea of the present invention, in the embodiments of the present invention may be explained by the above standard specifications. All terms used in the embodiments of the present invention may be explained by the standard specifications.

The following techniques are applicable to a variety of wireless access systems, for example, Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communication (GSM)/General Packet Radio Service (GPRS)/Enhanced Data rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802-20, and Evolved UTRA (E-UTRA).

The term as used in the present disclosure, first and/or second may be used to describe various components, not limiting the components. These expressions are used only to distinguish one component from another component. For example, a first component may be referred to as a second component and vice versa without departing from the scope of the present disclosure.

When it is said that a part 'includes' a component throughout the specification, this means that unless otherwise specified, the part may further include another component, not excluding another component. In addition, the term 'unit', '-er(or)', or the like signifies a unit of processing at least one function or operation. This may be implemented in hardware, software, or a combination of them.

FIG. 1 is a view illustrating an exemplary configuration of a Wireless Local Area Network (WLAN) system.

As illustrated in FIG. 1, the WLAN system includes at least one Basic Service Set (BSS). The BSS is a set of STAs that are able to communicate with each other through successful acquisition of synchronization.

An STA is a logical entity including a physical layer interface between a Medium Access Control (MAC) layer and a wireless medium. STAs may include an AP and a non-AP STA. Among STAs, a portable terminal manipulated by a user is a non-AP STA. If an STA is simply mentioned, the STA refers to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

An AP is an entity that provides access to a Distribution System (DS) to an associated STA through a wireless medium. The AP may also be referred to as a centralized controller, a Base Station (BS), a Node-B, a Base Transceiver System (BTS), or a site controller.

BSSs may be classified into infrastructure BSS and Independent BSS (IBSS).

The BSSs illustrated in FIG. 1 are IBSSs. An IBSS refers to a BSS that does not include an AP. Since the IBSS does not include an AP, the IBSS is not allowed to access the DS and thus forms a self-contained network.

Figure 2:
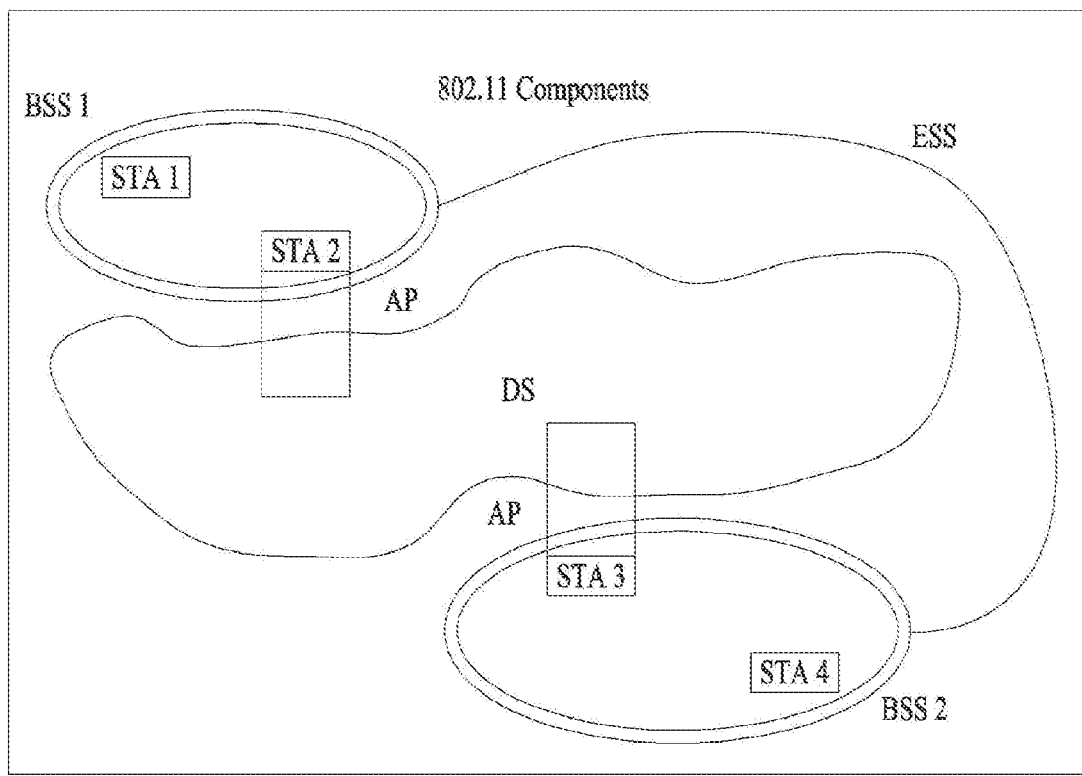
FIG. 2 is a view illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. Although communication between non-AP STAs is basically conducted through an AP in the infrastructure BSS, if a direct link is established between the non-AP STAs, direct communication may be performed between the non-AP STAs.

As illustrated in FIG. 2, a plurality of infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while conducting seamless communication.

The DS is a mechanism that connects a plurality of APs to one another. The DS is not necessarily a network. As long as it provides a specific distribution service, the DS is not limited to any specific type. For example, the DS may be a wireless network such as a mesh network, or a physical structure that connects APs to one another.

Figure 3:
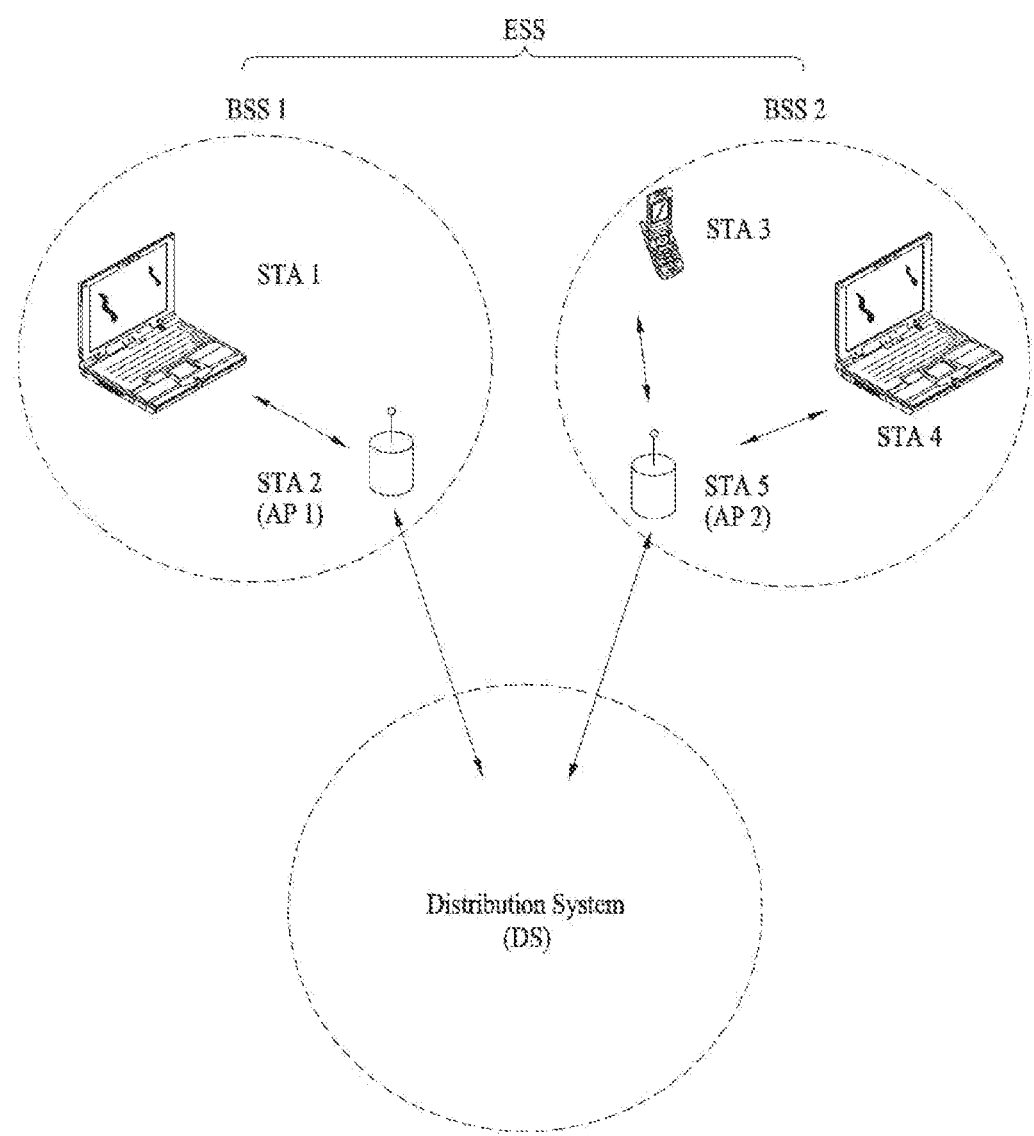
FIG. 3 is a view illustrating an exemplary structure of a WLAN system.

FIG. 3 is a view illustrating an exemplary structure of a WLAN system. In FIG. 3, an exemplary infrastructure BSS including a DS is illustrated.

In the example of FIG. 3, a first BSS (BSS 1) and a second BSS (BSS 2) form an ESS. An STA is a device operating in conformance to the Medium Access Control/Physical (MAC/PHY) regulations of IEEE 802.11 in the WLAN system. STAs include an AP STA and a non-AP STA. The non-AP STA is a device typically manipulated directly by a user, like a mobile phone. In the example of FIG. 3, STA 1, STA 3, and STA 4 are non-AP STAs, and STA 2 and STA 5 are AP STAs.

In the following description, the term non-AP STA is interchangeably used with terminal, WTRU, UE, MS, Mobile Subscriber Station (MSS), or the like. An AP conceptually corresponds to a BS, a Node-B, an evolved No-B (eNB), a BTS, a femto BS, and so on in other wireless communication fields.

Figure 4:
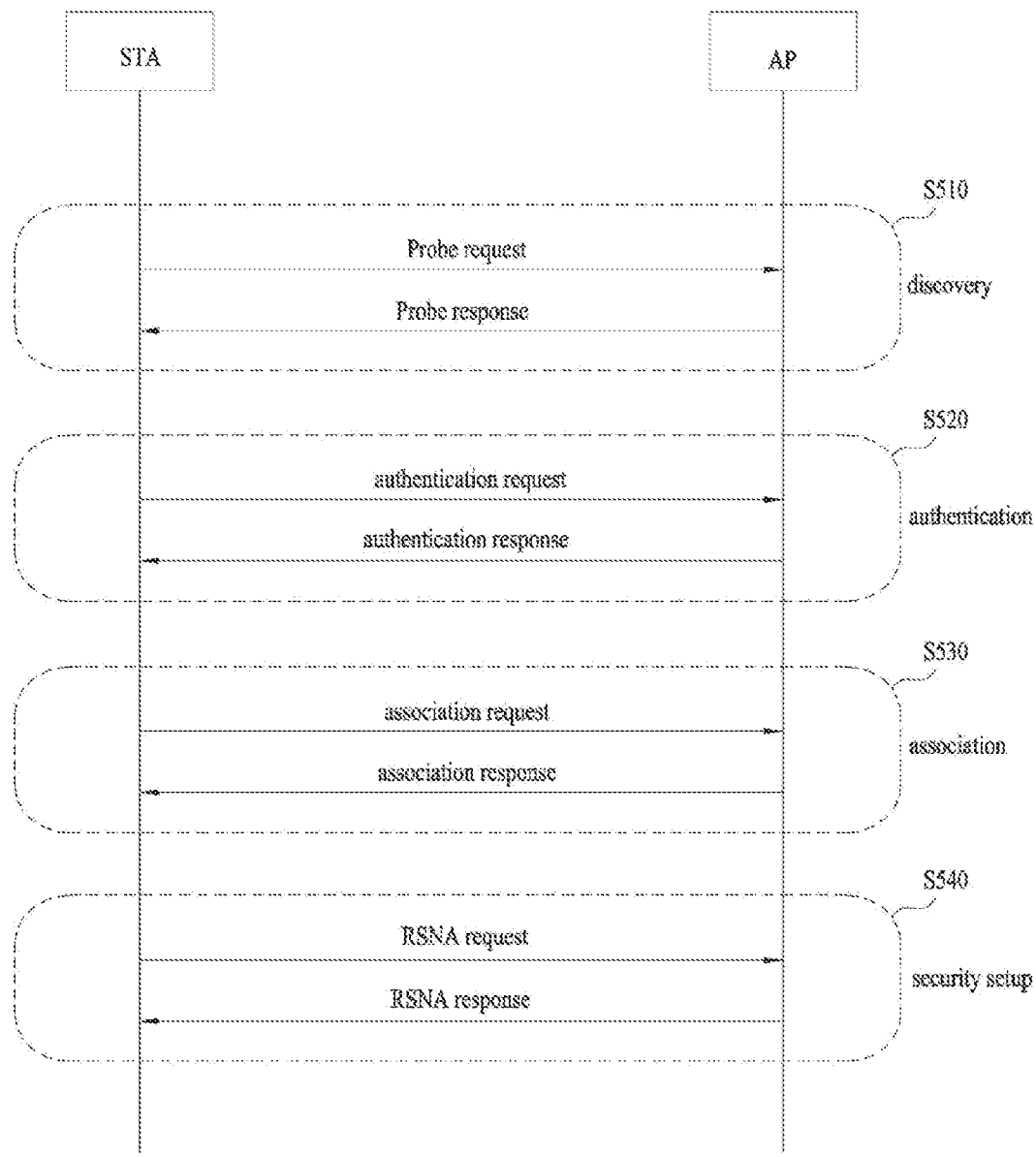
FIG. 4 is a diagram illustrating a signal flow for a general link setup procedure.
Figure 5:
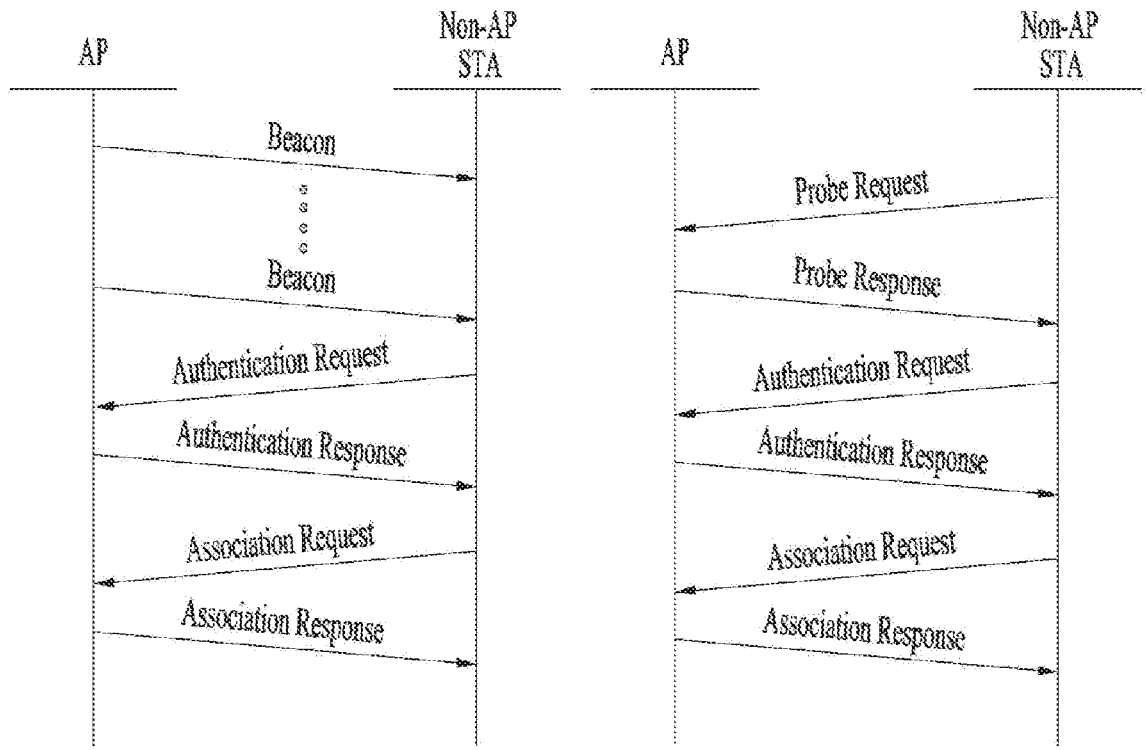
FIG. 5 is a diagram illustrating signal flows for an active scanning method and a passive scanning method.

FIG. 4 is a diagram illustrating a signal flow for a general link setup procedure, and FIG. 5 is a diagram illustrating signal flows for an active scanning method and a passive scanning method.

In order to set up a link with a network and transmit/receive data to/from the network, the STA should perform network discovery, authentication, association, and authentication for security. The link setup procedure may also be referred to as a session initiation procedure or a session setup procedure. In addition, discovery, authentication, association, and security setup steps of the link setup procedure may collectively be referred to as an association procedure.

An exemplary link setup procedure will be described with reference to FIG. 4.

In step S510, the STA may perform network discovery. The network discovery may include scanning of the STA. That is, the STA should search for an available network so as to access the network. The STA should identify a compatible network before joining in a wireless network. The process of identifying a network in a specific region is referred to as scanning.

Scanning is classified into active scanning and passive scanning. While FIG. 4 illustrates a network discovery operation including active scanning, the network discovery operation may involve passive scanning.

In the case of active scanning, a scanning STA transmits a probe request frame and waits for a response to the probe request frame, while switching channels one after another in order to discover an AP around the STA. A responder transmits a probe response frame as a response to the probe request frame to the STA that has transmitted the probe request frame. The responder may be the last STA that has transmitted a beacon frame in a BSS of a scanned channel. In a BSS, since an AP transmits a beacon frame, the AP is a responder, whereas in an IBSS, since STAs of the IBSS sequentially transmit beacon frames, the responder is not constant. For example, if an STA transmits a probe request frame on channel 1 and receives a probe response frame on channel 1, the STA may store BSS information included in the received probe response frame, move to the next channel (for example, channel 2), and perform scanning on the next channel in the same manner (i.e., probe request/response transmission/reception on channel 2).

Referring to FIG. 5, the scanning operation may also be carried out by passive scanning. An STA that performs passive scanning waits for a beacon frame, while switching channels one after another. The beacon frame is one of management frames in IEEE 802.11, which is periodically transmitted to indicate the presence of a wireless network, and enable the scanning STA to search for the wireless network and join in the wireless network. In a BSS, an AP periodically transmits a beacon frame, whereas in an IBSS, STAs of the IBSS sequentially transmit beacon frames. Upon receipt of a beacon frame during scanning, an STA stores BSS information included in the beacon frame, switches to another channel, and records beacon frame information for each channel. Upon receipt of a beacon frame during scanning, an STA stores BSS information included in the received beacon frame, switches to the next channel, and performs scanning on the next channel in the same manner.

A comparison between active scanning and passive scanning reveals that active scanning advantageously has a shorter delay and less power consumption than passive scanning.

After the STA discovers the network, the STA may perform an authentication procedure in step S520. The authentication procedure may be referred to as a first authentication procedure to clearly distinguish the authentication procedure from a security setup procedure of step S540.

The authentication procedure may include transmission of an authentication request frame to an AP by the STA, and transmission of an authentication response frame to the STA by the AP in response to the authentication request frame. The authentication frame used for an authentication request/response may be a management frame.

The authentication frame may include information about an authentication algorithm number, an authentication transaction sequence number, a status code, challenge text, a Robust Security Network (RSN), a Finite Cyclic Group (FCG), and so on. The above-mentioned information may be an example of part of information that may be included in the authentication request/response frame, and may be replaced with other information or include additional information.

The STA may transmit the authentication request frame to the AP. The AP may determine whether to authenticate the STA based on information included in the received authentication request frame. The AP may provide the result of the authentication to the STA in the authentication response frame.

After the STA is successfully authenticated, the association procedure may be carried out in step S530. The association procedure may involve transmitting an association request frame to the AP by the STA, and transmitting an association response frame to the STA by the AP in response to the association request frame.

For example, the association request frame may include information about various capabilities, a beacon listen interval, a Service Set Identifier (SSID), supported rates, supported channels, an RSN, a mobility domain, supported operating classes, a Traffic Indication Map (TIM) broadcast request, interworking service capability, and so on.

For example, the association response frame may include information about various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, and so on.

The above-mentioned information may be an example of part of information that may be included in the association request/response frame, and may be replaced with other information or include additional information.

After the STA is successfully associated with the network, a security setup procedure may be carried out in step S540. The security setup procedure of step S540 may be referred to as an authentication procedure based on a Robust Security Network Association (RSNA) request/response. The authentication procedure of step S520 may be referred to as the first authentication procedure, and the security setup procedure of step S540 may also be simply referred to as an authentication procedure.

For example, the security setup procedure of step S540 may include, for example, a private key setup procedure through 4-way handshaking based on an Extensible Authentication Protocol over LAN (EAPOL) frame. In addition, the security setup procedure may also be carried out in a security scheme that has not been defined in the IEEE 802.11 standards.

Figure 6:
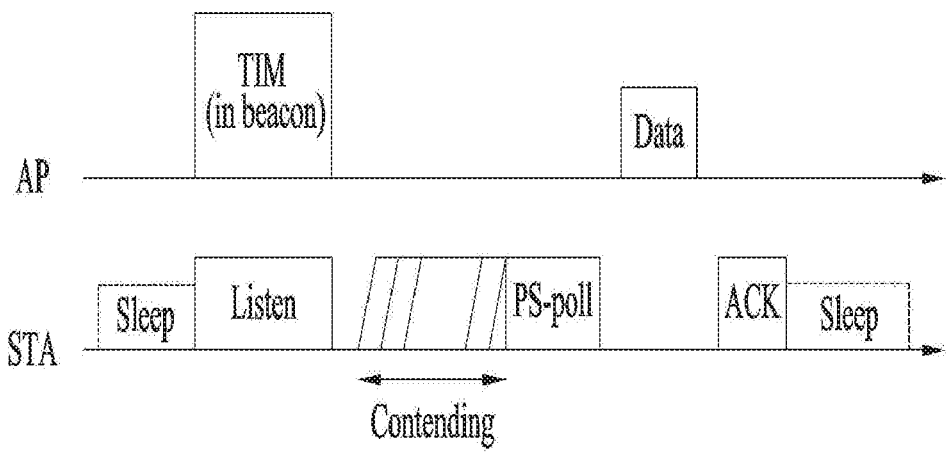
FIGS. 6, 7, and 8 are views illustrating operations of a Station (STA) in response to reception of a Traffic Indication Map (TIM).
Figure 7:
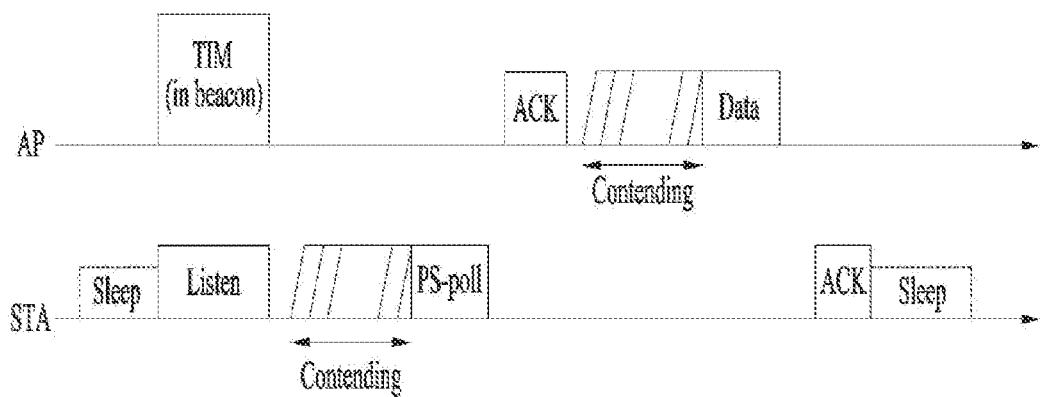
Figure 8:
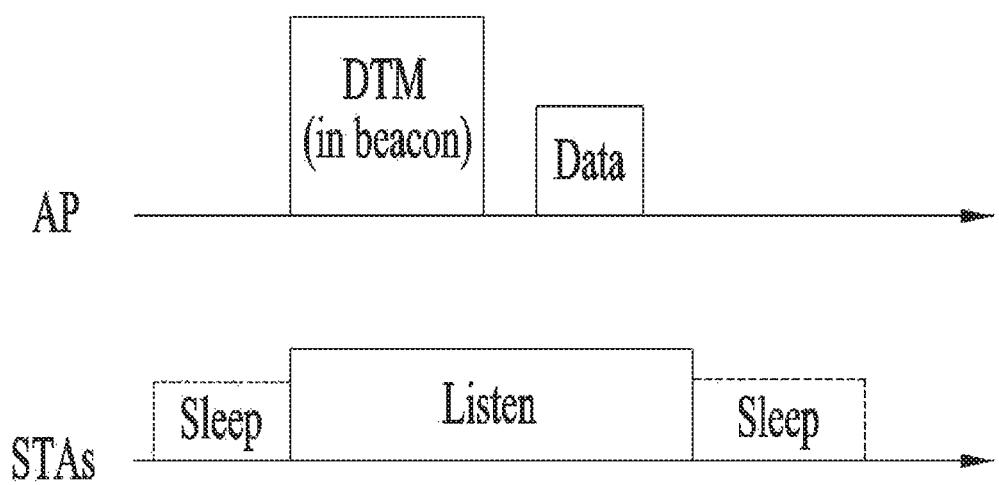
Figure 9:
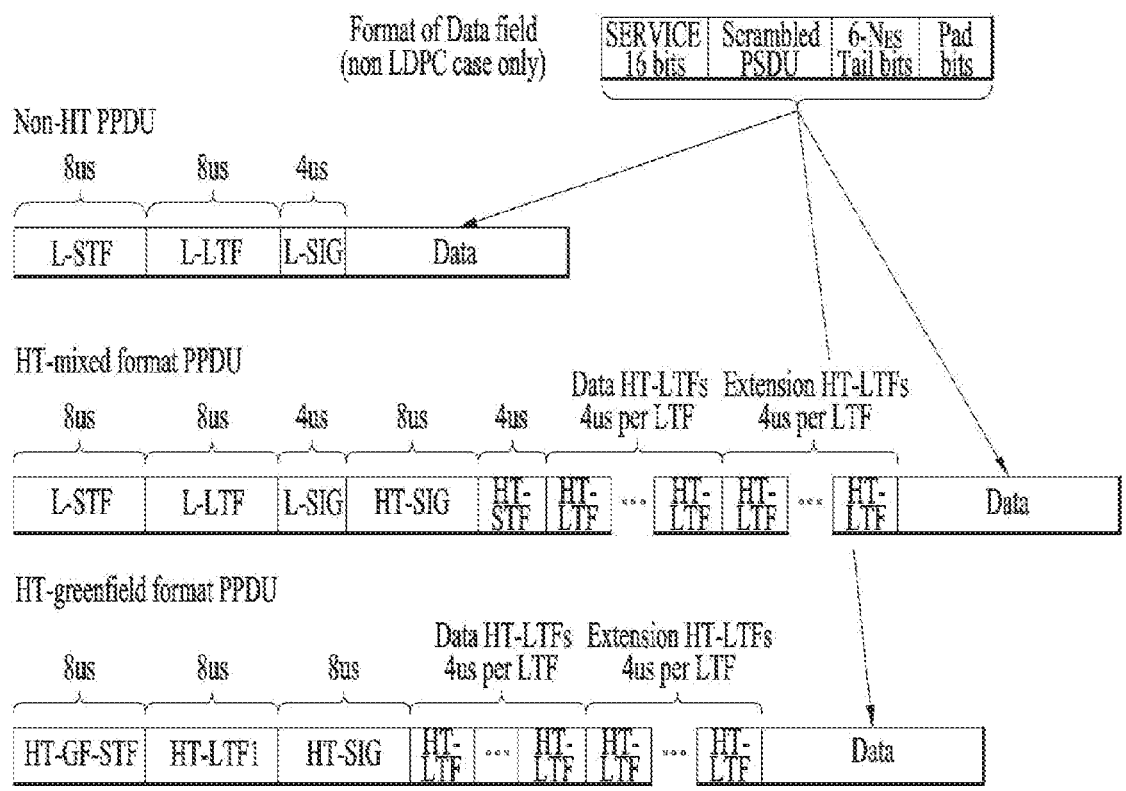

FIGS. 6, 7, and 8 are diagrams depicting an operation of an STA in response to reception of a TIM.

Referring to FIG. 6, the STA may transition from a sleep state to an awake state in order to receive a beacon frame including a TIM from an AP, and may determine the presence of buffered traffic to be transmitted to the STA by interpreting a received TIM element. After contending with other STAs to gain medium access for transmission of a Power Save-Poll (PS-Poll) frame, the STA may transmit the PS-Poll frame to the AP to request transmission of a data frame. Upon receipt of the PS-Poll frame from the STA, the AP may transmit a data frame to the STA. The STA may receive the data frame and transmit an ACKnowledgement (ACK) frame for the received data frame to the AP. Then, the STA may return to the sleep state.

As illustrated in FIG. 6, the AP may transmit the data frame a predetermined time (e.g., a Short Inter-Frame Space (SIFS)) after receiving the PS-Poll frame from the STA, that is, the AP may operate in an immediate response scheme. On the other hand, if the AP does not prepare the data frame to be transmitted to the STA during the SIFS after receiving the PS-Poll frame from the STA, the AP may operate in a deferred response scheme, which will be described with reference to FIG. 7.

In the example of FIG. 7, the STA transitions from the sleep state to the awake state, receives a TIM from the AP, and transmits a PS-Poll frame to the AP after contention in the same manner as in the example of FIG. 6. If the AP does not prepare a data frame during an SIFS in spite of reception of the PS-Poll frame, the AP may transmit an ACK frame to the STA, instead of the data frame. If the AP prepares a data frame after transmitting the ACK frame, the AP may transmit the data frame to the STA after contention. The STA may transmit an ACK frame indicating successful reception of the data frame to the AP, and then transition to the sleep state.

FIG. 8 is a view illustrating exemplary transmission of a Delivery TIM (DTIM) from an AP. STAs may transition from the sleep state to the awake state to receive a beacon frame including a DTIM element from the AP. The STAs may determine from the received DTIM that a multicast/broadcast frame will be transmitted. After transmitting the beacon frame including the DTIM, the AP may transmit data (i.e., the multicast/broadcast frame) immediately without transmitting/receiving a PS-Poll frame. The STAs may receive data, maintaining the awake state after receiving the beacon frame including the DTIM, and return to the sleep state, after completion of the data reception.

FIGS. 9 to 13 are views illustrating exemplary frame structures in an IEEE 802.11 system.

An STA may receive a Physical Layer Convergence Protocol (PLCP) Packet Data Unit (PPDU). A PPDU frame format may include Short Training Field (STF), Long Training Field (LTF), SIGNAL (SIG), and Data. For example, a PPDU format may be configured according to the type of the PPDU frame format.

For example, a non-High Throughput (non-HT) PPDU frame format may include only Legacy-STF (L-STF), Legacy-LTF (L-LTF), SIG, and Data.

The type of a PPDU frame format be one of HT-mixed format PPDU and HT-greenfield format PPDU. An additional STF, LTF, and SIG field (or an STF, an LTF, and a SIG field of a different type) may be included between the SIG field and the Data field in the above-described PPDU formats.

Figure 10:
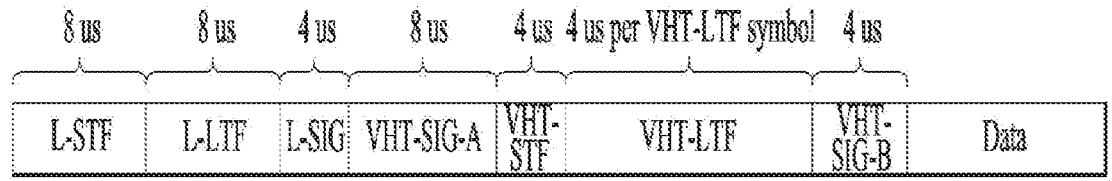

Referring to FIG. 10, a Very High Throughput (VHT) PPDU format may be configured. An additional STF, LTF, and SIG field (or an STF, LTF, and SIG field of a different type) may also be included between the SIG field and the Data field in the VHT PPDU format. More specifically, at least one of VHT-SIG-A, VHT-STF, VHT-LTF, and VHT-SIG-B may be included between the L-SIG field and the Data field in the VHT PPDU format.

STF may be a signal used for Automatic Gain Control (AGC), diversity selection, fine time synchronization, and so on. LTF may be a signal used for channel estimation, frequency error estimation, and so on. STF and LTF may be collectively called a PLCP preamble, and the PLCP preamble may be a signal used for synchronization and channel estimation at an OFDM physical layer.

Figure 11:
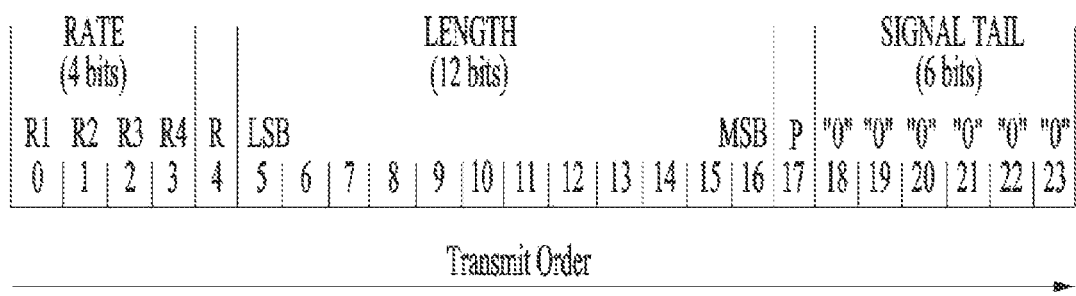

Referring to FIG. 11, the SIG field may include RATE and LENGTH. The RATE field may include information about modulation and a coding rate of data, and the LENGTH field may include information about the length of the data. Additionally, the SIG field may include a parity bit, SIG TAIL bits, and so on.

The Data field may include a SERVICE field, a PLCP Service Data Unit (PSDU), and PPDU TAIL bits. When needed, the Data field may further include padding bits.

Figure 12:
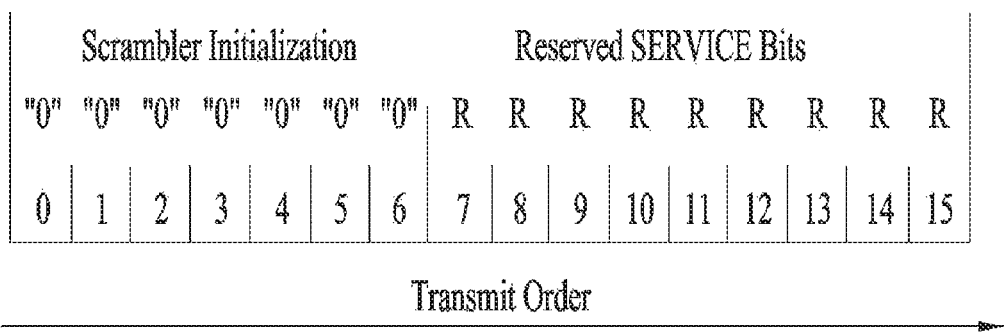

Referring to FIG. 12, a part of the bits of the SERVICE field may be used for synchronization of a descrambler in a receiver, and another part of the bits of the SERVICE field may be reserved. The PSDU corresponds to a MAC Protocol Data Unit (MAC PDU) defined in the MAC layer, and may include data generated/used in a higher layer. The PPDU TAIL bits may be used to return an encoder to a zero state. The padding bits may be used to match the length of the Data field on a predetermined unit basis.

For example, the VHT PPDU format may include an additional STF, LTF, and SIG field (or an STF, LTF, and SIG field of a different type), as described before. L-STF, L-LTF, and L-SIG of a VHT PPDU may be a non-VHT part, and VHT-SIG-A, VHT-STF, VHT-LTF, and VHT-SIG-B of the VHT PPDU may be a VHT part. In other words, areas for non-VHT fields and VHT fields may be defined separately in the VHT PPDU. For example, VHT-SIG-A may include information used to interpret the VHT PPDU.

Figures 13, 14:
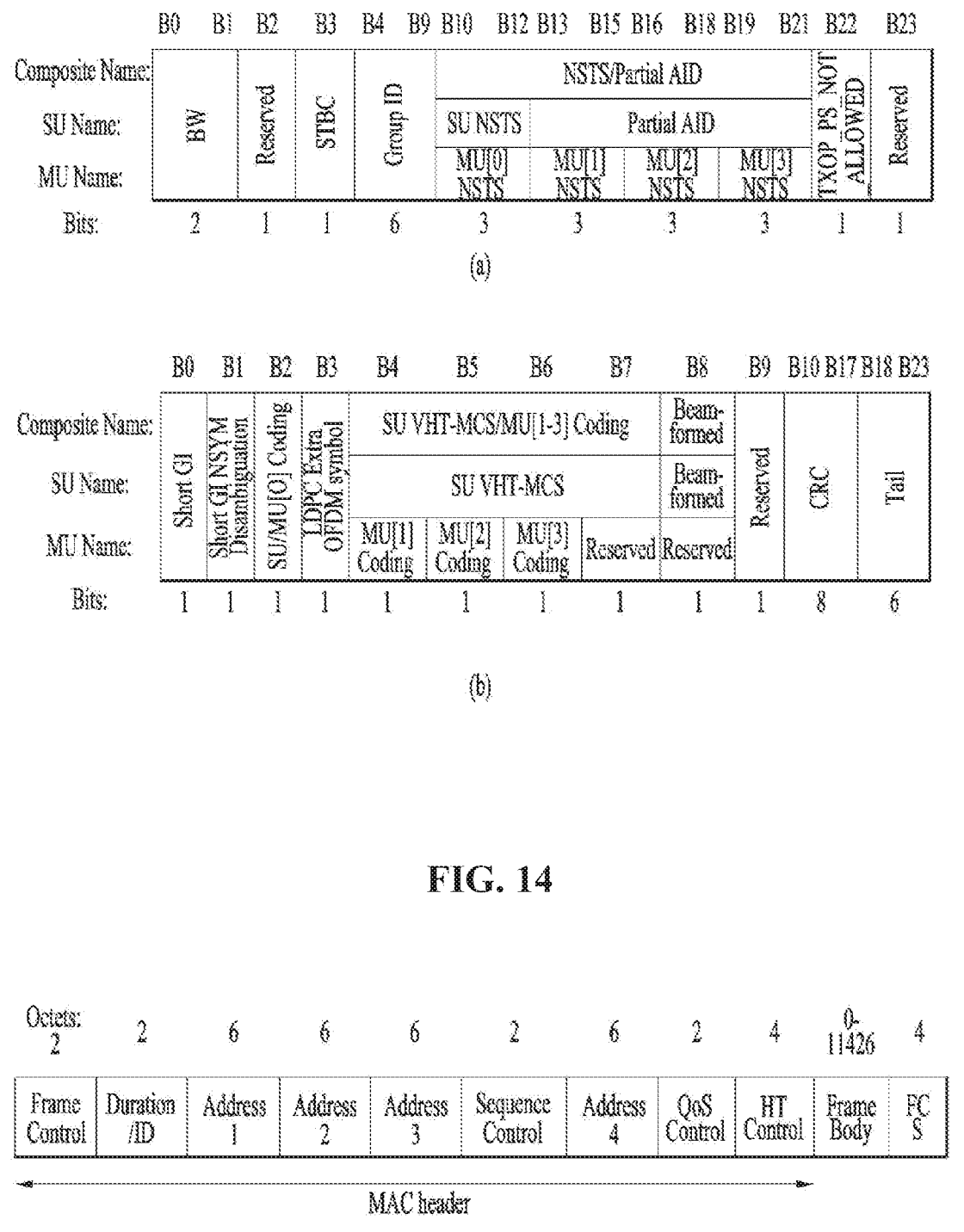

For example, referring to FIG. 13, VHT-SIG-A may include VHT-SIG-A1 ((a) of FIG. 13) and VHT-SIG-2 ((b) of FIG. 13). Each of VHT-SIG-A1 and VHT-SIG-A2 may include 24 data bits, and VHT-SIG-A1 may be transmitted before VHT-SIG-A2. VHT-SIG-A1 may include BandWidth (BW), Space Time Block Coding (STBC), Group ID, Number of Space-Time Streams/Partial Association ID (NSTS/Partial AID), TXOP_PS_NOT_ALLOWED, and Reserved. VHT-SIG-2 may include Short Guard Interval (GI), Short GI NSYM Disambiguation, Single User/Multi-User[0] Coding (SU/MU[0] Coding), Low Density Parity Check (LDPC) Extra OFDM Symbol, SU VHT-MCS/MU[1-3] Coding, Beamformed, Cyclic Redundancy Check (CRC), Tail, and Reserved. Information about a VHT PPDU may be acquired from these fields.

FIGS. 14, 15, and 16 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 14, the MAC header may include Frame Control, Duration/ID, Address, Sequence Control, QoS Control, and HT Control. In the MAC header, the Frame Control field may include control information required for frame transmission/reception. The Duration/ID field may be set to a time required to transmit a frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 15 and 16, a VHT subfield of the HT Control field may indicate whether the HT Control field is of the HT-variant type or the VHT-variant type. For example, if the VHT subfield is set to '0', the HT Control field may be of the HT-variant type, and if the VHT subfield is set to '1', the HT Control field may be of the VHT-variant type.

For example, referring to FIG. 15, if the HT Control field is of the HT-variant type, the HT Control field may include Link Adaptation Control, Calibration Position, Calibration Sequence, CSI/Steering, HT NDP Announcement, AC constraint, RDG/More PPDU, and Reserved. For example, referring to (b) of FIG. 15, the Link Adaptation Control field may include TRQ, MAI, MFSI, and MFB/ASELC. For more details, refer to the IEEE 802.11 standard specifications.

For example, referring to FIG. 16, if the HT Control field is of the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved. For example, referring to (b) of FIG. 16, the MFB field may include VHT N_STS, MCS, BW, and SNR.

Figures 17, 18:
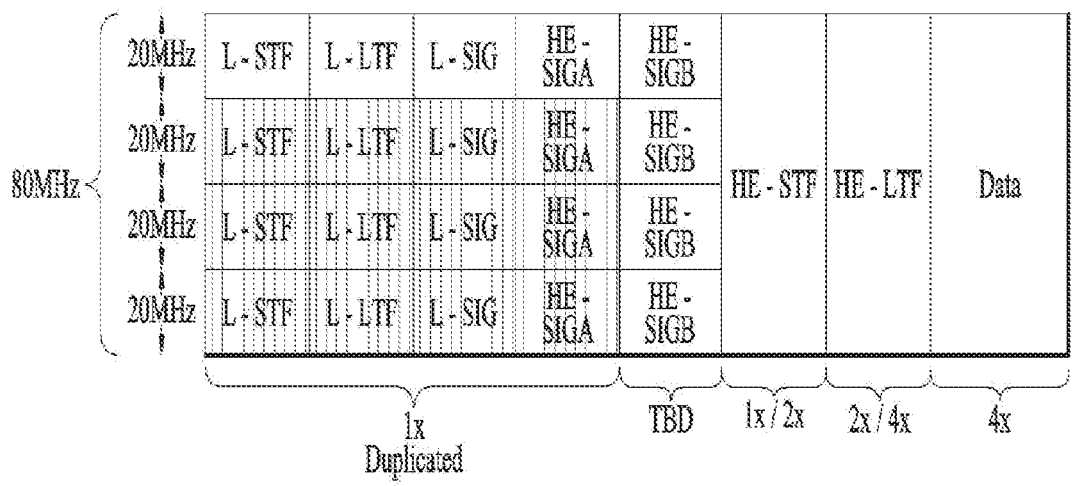
FIG. 17 is a view illustrating a Short MAC frame format.
FIG. 18 is a view illustrating an exemplary High Efficiency (HE) Physical Layer Protocol Data Unit (PPDU) format according to an embodiment of the present invention.

FIG. 17 is a diagram illustrating a Short MAC frame format. A MAC frame may be configured as a Short MAC frame by reducing unnecessary information when needed, to prevent waste of radio resources. For example, referring to FIG. 17, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field is 3 bits in the Frame Control field of the MAC header, with value 0 to value 3 providing address information and value 4 to value 7 being reserved. New address information may be provided using the reserved values in the present invention, which will be described later.

In the Frame Control field of the MAC header, the From DS field may be 1 bit.

Each of the More Fragment, Power Management, More Data, Protected Frame, End of Service Period, Relayed Frame, and Ack Policy fields may be 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in the active state. The AP VHT STA may switch the non-AP VHT STA to the doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

- A VHT MU PPDU is received, and the STA is not indicated as a group member by an RXVECTOR parameter, Group_ID.
- An SU PPDU is received, and an RXVECTOR parameter, PARTIAL_AID is not 0 or does not match the partial AID of the STA.
- Although the STA determines that the RXVECTOR parameter, PARTIAL_AID matches the partial AID of the STA, the Receiver Address (RA) of the MAC header does not match the MAC address of the STA.
- Although the RXVECTOR parameter, Group_ID indicates that the STA is a group member, an RXVECTOR parameter, NUM_STS is set to 0.
- A VHT NDP Announcement frame is received, and the RXVECTOR parameter, PARTIAL_AID is set to 0 and does not match the AID of an Info field for the STA.
- The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to a non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

HE PPDU Format

A frame structure for IEEE802.11ax may not be determined yet and is expected below.

FIG. 18 is a diagram showing an example of high efficiency (HE) PPDU format according to an embodiment of the present invention.

Like the frame structure shown in FIG. 18, 11ax may maintain an existing 1× symbol structure (3.2 us) up to HE-SIG (SIG-A and SIG-B) and a HE-preamble and a Data part may use a frame structure with a 4× symbol (12.8 us) structure. Needless to say, application of the present invention has no problem as long as not being directly against the following description even if the aforementioned structure is changed.

The L-part may comply with structures of L-STF, L-LTF, and L-SIG without being maintained in an existing WiFi system. L-SIG may be generally used to transmit packet length information. The HE-part may be a part that is newly configured for the 11ax standard (high efficiency). HE-SIG (HE-SIGA and HE-SIGB) may be present between the L-part and HE-STF and may indicate common control information and user specific information. In addition, it may include HE-SIG A for transmitting the common control information and HE-SIG B for transmitting the user specific information. 11ax does not define information of HE-SIG yet but HE-SIGA and HE-SIGB may contain and transmit the following information.

Table 1 below shows an example of information to be transmitted through HE-SIG A and Table 2 below shows an example of information to be transmitted through HE-SIG B.

TABLE 1

| Field | Description |
| --- | --- |
| Bandwidth | Indicating a bandwidth in which a PPDU is transmitted. For example, 20 MHz, 40 MHz, 80 MHz |
| Color bits | Indicating an BSS ID |
| MCS | Indicating the MCS of HE-SIGB |
| N_sym | Indicating the number of symbol for HE-SIG B |
| Guard Interval (GI) indication | Indicating the CP length of HE-SIGB (ex. 0.4, 0.8, 1.6, 2.4) |
| MU indication | Indicating whether a PPDU is an SU-MIMO PPDU or an MU-MIMO PPDU |

TABLE 2

| Field Partial AID | Description |
| --- | --- |
| MCS | Indicating the MCS of Data for each STA |
| Stream information | Indicating the number of spatial streams for each STA, |
| encoding | Indicating whether BCC or LDPC |
| beam formed | Indicating whether beam forming or not |
| Guard Interval (GI) indication | Indicating the CP length of Data for each STA |
| Allocation information | Indicating a resource block (subchannel index or subband index) allocated to each STA in a bandwidth in which a PPDU is transmitted |
| STBC | Space Time Block Coding |
| length | Indicating the length of HE PPDU is transmitted in a bandwidth |

HE-SIG B may include the aforementioned information that is divided into common information and individual information. In detail, an individual field including individual information for each STA may be included after a common field including common information.

HE-SIG A including the aforementioned information may be transmitted using the same transmission format (1× symbol structure) as a legacy part and, when being transmitted using a wide bandwidth (ex. 40 MHz, 80 Mhz, and 160 MHz), HE-SIG A may be duplicated per 20 MHz and transmitted for each channel. However, a method and structure of transmitting HE-SIG B including user specific information is not be determined yet.

Accordingly, one aspect of the present invention proposes a method of effectively transmitting HE-SIG-B including user specific information of an STA.

HE-SIG B Transmission Method

HE-SIG-B for transmitting user specific information may be transmitted using an option as follows.

Figure 19:
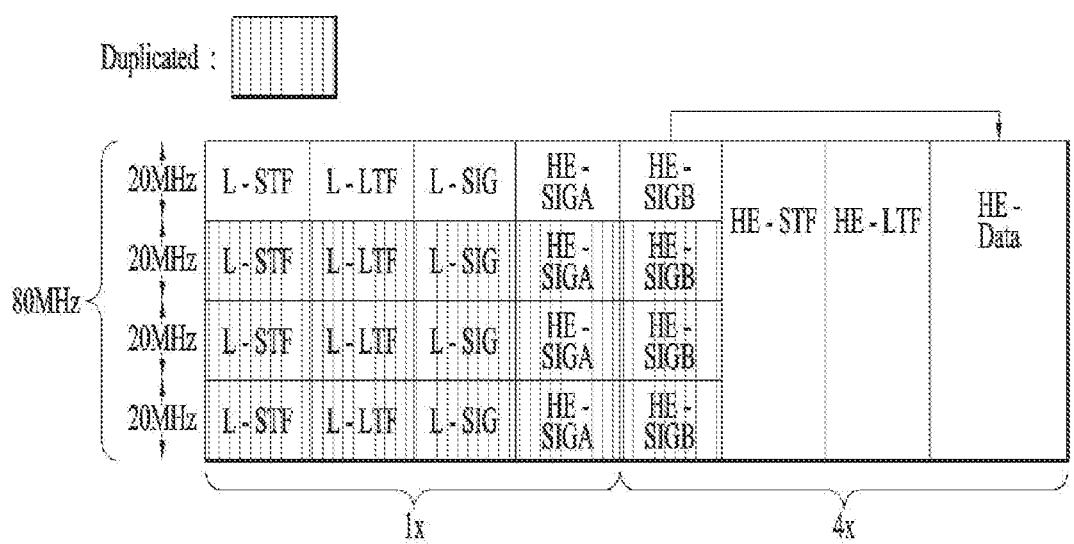
FIG. 19 is a diagram for explanation of repeating and transmitting HE-SIG B in units of 20 MHz according to an embodiment of the present invention.

FIG. 19 is a diagram for explanation of repeating and transmitting HE-SIG B in units of 20 MHz according to an embodiment of the present invention.

As shown in FIG. 19, when a radio frame is transmitted through a wideband (e.g., a band of 80 MHz in FIG. 19), the same HE-SIG-B information may be duplicated and transmitted per 20 MHz channel.

Since the HE-SIG-B information is duplicated and transmitted per 20 MHz, more duplication gains may be acquired according to the number of duplicated channels and, accordingly, robust performance may be achieved in the case of transmission of a wide BW. However, information of many STAs need to be delivered in a channel of 20 MHz and, thus, overhead may be disadvantageously high.

Figure 20:
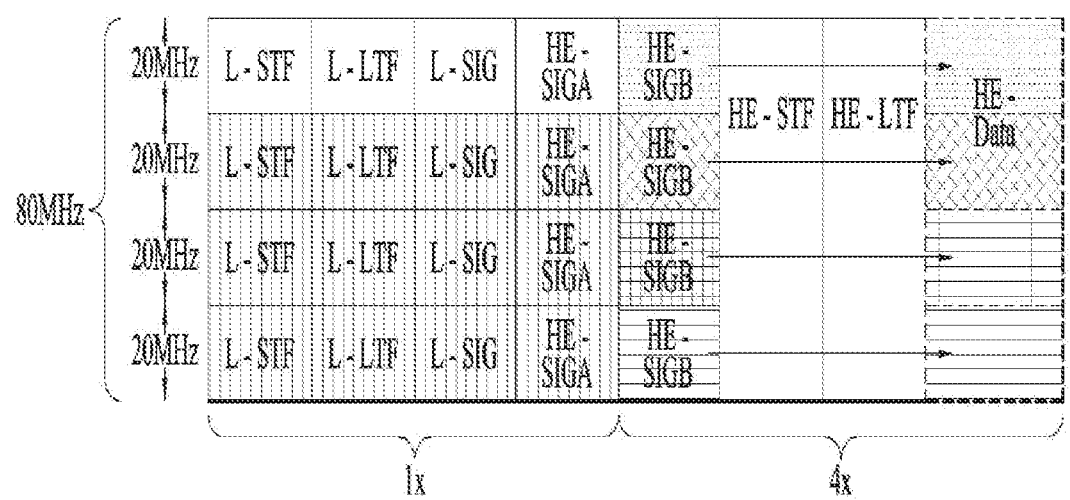
FIG. 20 is a diagram for explanation of a method of transmitting independent control information per 20 MHz by HE-SIG B according to another embodiment of the present invention.

FIG. 20 is a diagram for explanation of a method of transmitting independent control information per 20 MHz by HE-SIG B according to another embodiment of the present invention.

HE-SIG-B information may be independently configured in each channel of 20 MHz to transmit different information in each channel of 20 MHz and FIG. 20 shows an example of a structure of HE-SIG-B transmitted using a bandwidth of 80 MHz.

Different information may be transmitted per 20 MHz to enhance performance via band selection for a situation of each STA and different MCSs for respective channels may be used to reduce overhead. However, a length of information transmitted per 20 MHz channel may be changed and, thus, it is advantageous that the length of HE-SIG-B needs to be aligned and a plurality of decoders is required to simultaneously decode the received information.

Figures 21, 22:
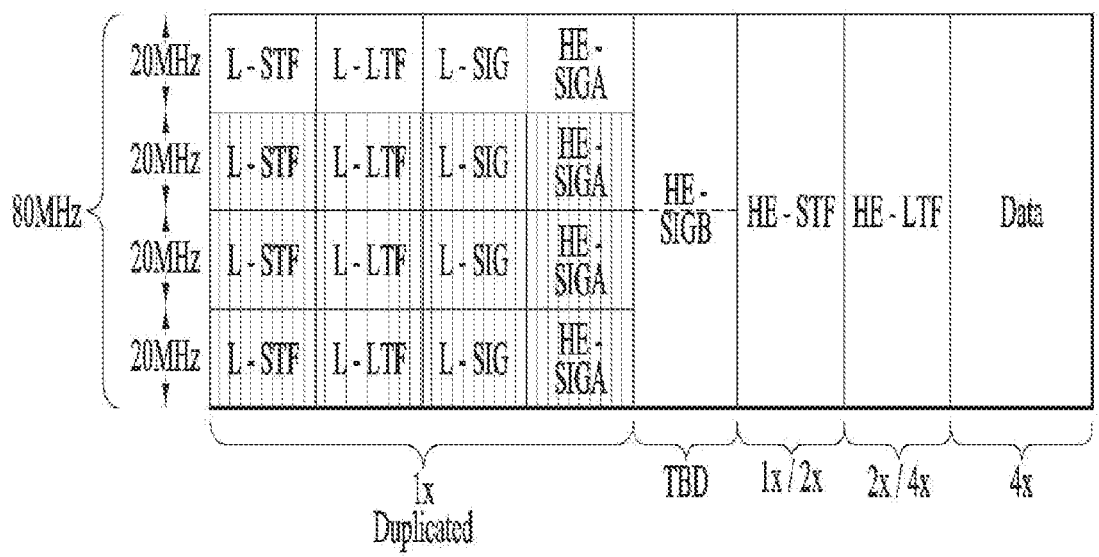
FIG. 21 is a diagram for explanation of a method of transmitting HE-SIG B using a full bandwidth according to another embodiment of the present invention.
FIG. 22 is a diagram for explanation of a method of repeatedly transmitting HE-SIG B in units of 40 MHz to contain independent control information within 40 MHz according to another embodiment of the present invention.

FIG. 21 is a diagram for explanation of a method of transmitting HE-SIG B using a full bandwidth according to another embodiment of the present invention.

HE-SIG-B information may be transmitted through a full bandwidth and FIG. 21 illustrates an example of a structure of HE-SIG-B transmitted using a bandwidth of 80 MHz.

Since an available tone of a full bandwidth is used to transmit a large amount of information, a data rate may be increased, but since a full bandwidth is used, performance may be degraded compared with other options due to influence of interference and a channel.

FIG. 22 is a diagram for explanation of a method of repeatedly transmitting HE-SIG B in units of 40 MHz to contain independent control information within 40 MHz according to another embodiment of the present invention.

An embodiment illustrated in FIG. 22 is a compromise proposal of FIGS. 19 and 20. That is, independent control information may be transmitted in units of 20 MHz in a bandwidth of 40 MHz to enhance band selectively according to a situation for each STA and, simultaneously, control information may be repeatedly transmitted in units of 40 MHz to acquire repeat gain.

A transmission method of HE-SIG B is not limited to the aforementioned example and various embodiments of the methods described with reference to FIGS. 19 to 22 may also be contained in the scope of the present invention.

Encoding Method of HE-SIG B

To enhance transmission efficiency and performance of HE-SIG-B transmitted using the aforementioned HE-SIG B transmission structures, an encoding method used for HE- SIG-B may also be considered therewith. Largely, the following encoding method may be considered and will be described below.

<Joint Encoding Method>

User specific information of a plurality of STAs may be encoded at one time and, in this case, one cyclic redundancy check (CRC) may be attached to the encoded information bit and transmitted. Since a plurality of pieces of information is encoded and transmitted at one time, a system is simple but, even if only some transmitted information is damaged, corresponding information may not be successfully received and, since low MCS is always used for transmission in consideration of reception of a STA with a poor reception situation even if reception situations of some STAs are good, overhead may be increased.

<Individual Encoding Method>

Information of each STA may be encoded using MCS proper to a reception situation for each STA and CRC may be attached to the encoded information of each STA to determine whether error of information occurs. Accordingly, MCS proper to a STA situation may be applied during encoding to enhance encoding performance and CRC may be attached to individual information of an STA to enhance overhead of CRC compared with the joint method, but overall overhead of transmitted information may be reduced due to use of various MCSs.

In the aforementioned, the same CRC or different CRCs may be used in encoded information of STAs and, to reduce CRC overhead, transmission information may be configured using only one CRC after individually coded information is gathered.

<Group Unit Encoding Method>

As a compromise proposal of the aforementioned encoding methods, individual information of a plurality of STAs may be grouped and encoded in predetermined units.

Figure 23:
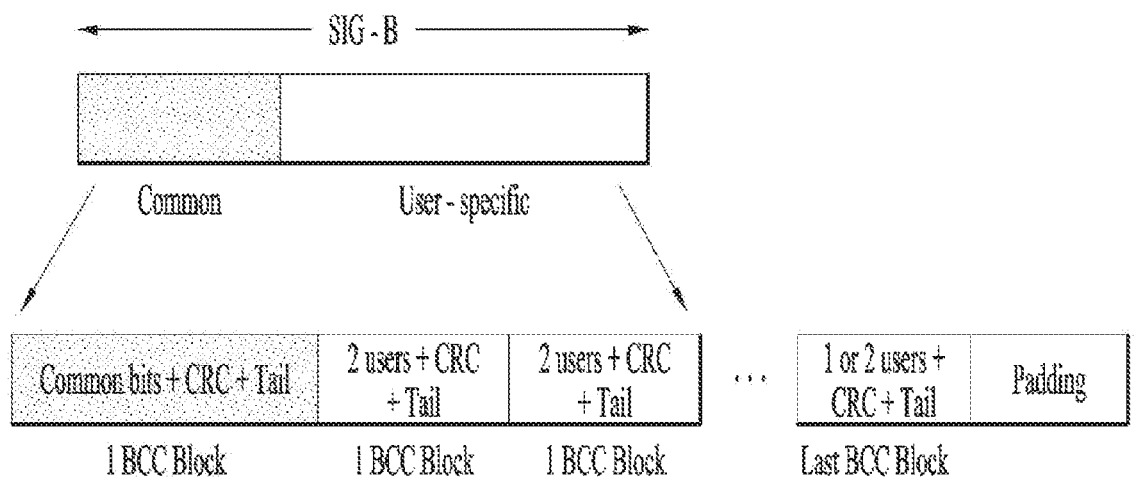
FIG. 23 is a diagram for explanation of a method of performing group encoding in units of two users according to an embodiment of the present invention.

FIG. 23 is a diagram for explanation of a method of performing group encoding in units of two users according to an embodiment of the present invention.

As described above, HE-SIG B may include a common field and an individual field and, in an example of FIG. 23, information of the common field may be encoded in one BCC block to include CRC and Tail bits and individual fields subsequent thereto. In the individual field, a predetermined number of users may be grouped and encoded and FIG. 23 shows an example in which information of two users is grouped and encoded.

A padding bit may be subsequent to a last BCC block, which will be described below.

Combination of HE-SIG B Transmission Methods

Hereinafter, to enhance performance of HE-SIG-B and to reduce overhead, an effective HE-SIG-B transmission method in consideration of the aforementioned transmission options and encoding methods will be proposed.

(1) First Embodiment—(Duplication Per 20 MHz Channel)+Individual Encoding

The first embodiment proposes use of a combination of a method of duplicating and transmitting control information in units of 20 MHz and an individual encoding method.

The first embodiment may have good performance than other options due to duplication gain. However, when HE-SIG-B information of all STAs needs transmitted through a channel of 20 MHz and low MCS (ex. MCS10) is used in consideration of STA with a poor reception situation among STAs, overhead may be increased to reduce performance gain. Accordingly, to compensate for this, when HE-SIG-B is used according to the first embodiment, information of STAs, transmitted to HE-SIG-B, may be encoded using MCS proper to each STA via individual encoding to reduce overhead.

For example, when user specific information (ex. 24 bits) of four STAs is transmitted, overhead of HE-SIG-B using joint encoding and individual encoding when supportable MCS of each STA is MCS10, MCS1, MCS1, and MCS3 will be described.

When joint coding is used, lowest MCS is MCS10 and information on all STAs is encoded and transmitted using MCS10 for reception of STA for supporting joint coding and, in this case, overhead is as follows.

$$\text{Overhead\_joint} = (\text{number of STA})*(\text{user specific information bits})/(\text{modulation order})/(\text{coding rate})+\text{CRC}/48 = (4*24*/(1/2)/(1/2))+32/48 = 8.6667$$

MCS-individual for each STA $$\text{Overhead\_individual} = \text{sum}(\text{overhead for each STA}) = ((24/(1/2)/(1/2)+32)+(24/2/(1/2)+8)+(24/2/(1/2)+8)+(24/4/(1/2)+4))/48 = 4.333$$

As such, duplication and individual encoding may be used to simultaneously acquire overhead reduction gain (i.e. 50%) with duplication gain.

Figure 24:
FIG. 24 is a diagram for explanation of a method of overcoming a problem when lengths of control information of respective STAs are different according to an embodiment of the present invention.
Figure 24:
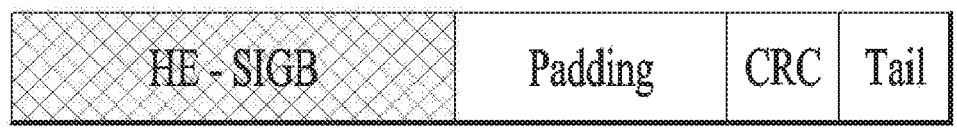
Figure 24:
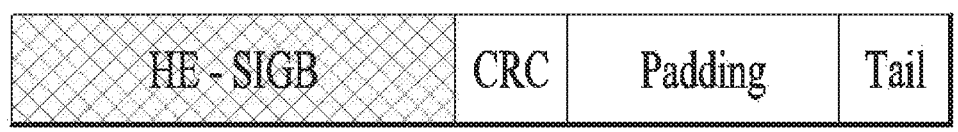

FIG. 24 is a diagram for explanation of a method of overcoming a problem when lengths of control information of respective STAs are different according to an embodiment of the present invention.

When user specific information is different for each STA, encoded information may be transmitted using the following method. Information may be aligned to a length corresponding to an available tone or a multiple thereof in a channel of 20 MHz channel, i.e., a length of one symbol or a plurality of symbols and, in this case, for alignment, padding may be attached to the information in equal number to a required length. That is, HE-SIG-B information of an STA may be delivered in a unit of symbol. For example, HE-SIG-B information of an STA may be configured in a unit of symbol in a 20 MHz channel and, in this case, when the information is smaller than or greater than a length of one symbol, alignment is performed using padding. In this case, padding may use zero padding and CRC may be attached to the information and then padding may be attached to reduce a decoding time differently from the case in which CRC is attached after padding, for rapid decoding.

As described above, a method of attaching padding may also be used when encoding in units of groups is performed like in FIG. 23. For example, when HE SIG B is transmitted through a bandwidth of 40 MHz, if a length of HE SIG B information transmitted through a specific 20 MHz band is different from HE SIG B information transmitted through an adjacent 20 MHz band, padding may be inserted to align the lengths as in FIG. 23. In this case, padding may be inserted after CRC and Tail bits according to block coding, thereby reducing a decoding time of an STA.

The method described with reference to FIG. 24 may use padding to reduce a gain for reducing overhead. Accordingly, individual encoded information of STAs may be sequentially and continuously delivered in a channel of 20 MHz as follows.

Figure 25:
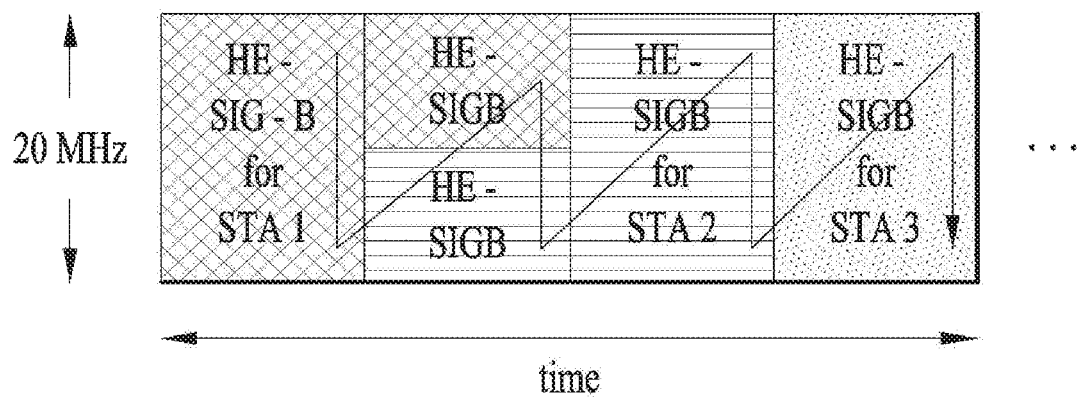
FIG. 25 is a diagram for explanation of a method of overcoming a problem when lengths of control information of respective STAs are different or lengths of control information of respective STAs are different from a length of a symbol according to another embodiment of the present invention.

FIG. 25 is a diagram for explanation of a method of overcoming a problem when lengths of control information of respective STAs are different or lengths of control information of respective STAs are different from a length of a symbol according to another embodiment of the present invention.

That is, even if length of control information of respective STAs are different or lengths of control information of respective STAs are not the same as a length of a symbol, control information may be included in a band of 20 MHz to prevent a time domain from being mismatched as shown in FIG. 25.

As shown in FIG. 25, when HE-SIG-B is transmitted, HE-SIG-B may not be configured in a unit of symbol. Accordingly, an STA that receives HE-SIG-B may decode HE-SIG-B in a unit of symbol to find out information of the STA to rapidly find the information of the STA and to reduce a decoding time. In addition, when HE-SIG-B information is across a plurality of symbols but not one symbol, whether reception of HE-SIG-B is successful may be determined using whether decoding of corresponding symbols is successful.

For example, when HE-SIG-B is transmitted over two symbols, an STA may be determined to successfully receive HE-SIG-B when both decoding of a first symbol and decoding of a second symbol are successful. As another example, whether reception of HE-SIG-B is successful may be determined according to whether decoding of a symbol including CRC is successful.

HE-SIG-B is decoded in a unit of a symbol via blind decoding and, thus, performance may be degraded and decoding time may be increased. Accordingly, the STA may transmit information on a length of HE-SIG-B for each STA to a common part or first symbol of HE-SIG-A/HE-SIG-B. In this case, the transmitted information may be implicitly or explicitly transmitted.

The above description may be merely an example and the aforementioned method may also be applied to the case in which individual encoding is used in other options.

In the above description, to reduce overhead of HE-SIG-B, common HE-SIG-B information to STAs may be transmitted through a first symbol of HE-SIG-B or a HE-SIG-B common part.

(2) Second Embodiment—(Independent Per 20 MHz Channel)+Individual Encoding

The second embodiment proposes use of a combination of a method of independently transmitting control information in units of 20 MHz and an individual encoding method.

An STA that transmits data using OFDMA may select a channel that is most appropriate to the STA in a bandwidth and, in this case, supported MCS may be changed for each STA according to an allocated resource. Accordingly, in consideration of band selection gain and a reception situation of an STA, HE-SIG-B may be transmitted using individual encoding and a structure for transmitting independent HE-SIG B information per 20 MHz to transmit the HE-SIG-B.

Figure 26:
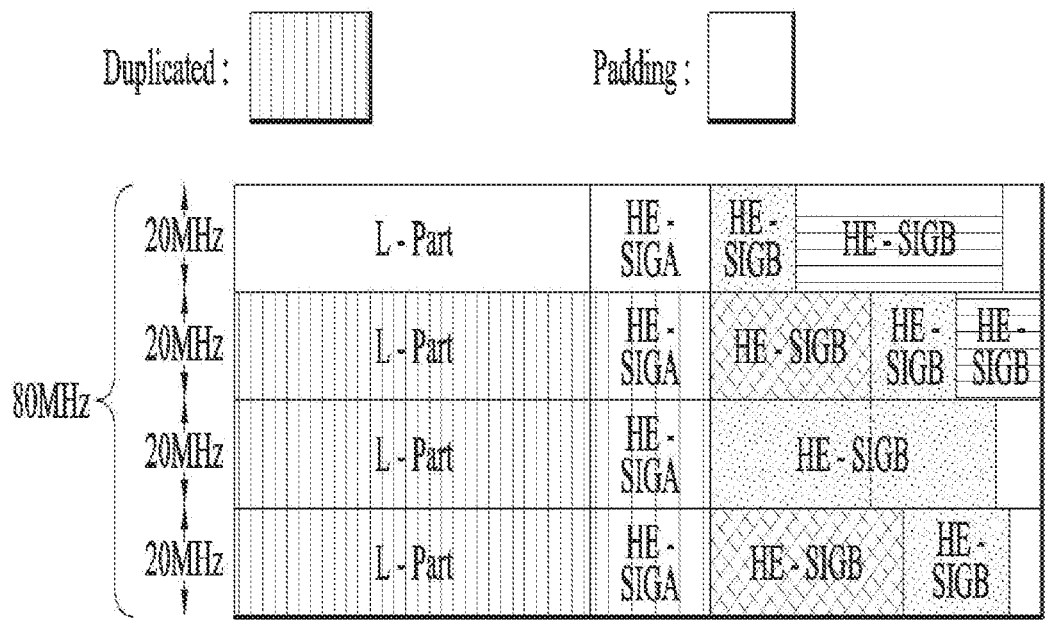
FIG. 26 is a diagram for explanation of a method of transmitting independent HE-SIG B using individual encoding in a bandwidth of 80 MHz according to an embodiment of the present invention.

FIG. 26 is a diagram for explanation of a method of transmitting independent HE-SIG B using individual encoding in a bandwidth of 80 MHz according to an embodiment of the present invention.

As shown in FIG. 26, HE-SIG-B information of each of STAs may be delivered or in a channel of 20 MHz channel or the information of STAs may be sequentially and continuously transmitted.

As shown in FIG. 26, padding may be used to align a length of HE-SIG-B. With regard to information on padding, information on a length of HE-SIGB or padding length information may be inserted into a first symbol or common information of HE-SIGB and, thus, a receiving STA/AP may recognize a padding length of HE-SIGB. The information may be transmitted through HE-SIG-A.

To match alignment of each 20 MHz channel and to reduce overhead of padding, common information of HE-SIG-B information of an STA may be transmitted through a part (ex. symbol and frequency) for transmitting a first symbol of HE-SIG-B or common information of HE-SIG-B. In this case, the common HE-SIG-B may be independently transmitted per 20 MHz channel or the same HE-SIG-B common information may be repeatedly transmitted per 20 MHz channel.

Information on transmission of the common HE-SIG-B may be transmitted through HE-SIG-A.

The information of the common HE-SIG-B transmitted through HE-SIG-A may include MCS, length of symbol, size, CP length, and so on. MCS information of HE-SIG-B transmitted through HE-SIG-A may be configured to include one or more of MCS information of common HE-SIG-B and user specific HE-SIG-B. MCS of the common HE-SIG-B may use various MCSs according to SNR/SINR of a STA (e.g., MCS used in HE-SIG-B includes MCS10, MCS0, MCS1, and MCS3) and, in this case, the MCS may include low MCS (ex. MCS0 and MCS10) to ensure reliability and may be fixed to low MCS (ex. MCS0 and MCS10) with most robust performance.

HE-SIG-B common information for transmitting common information to STAs and HE-SIG-B specific information for transmitting user specific information may be transmitted using different MCSs. The MCS of the common HE-SIG-B may be set as the same MCS as HE-SIG-A including the common information.

The user specific HE-SIG-B may be transmitted per STA using the same symbol number and, in this case, information on a symbol length may be transmitted through the common HE-SIG-B.

(3) Third Embodiment—(Structure of FIG. 20 or 22)+Individual Encoding

To match alignment of each 20 MHz channel and to reduce overhead of padding, HE-SIG-B may be transmitted in the same symbol by grouping STAs according to MCS for each STA. For example, when a HE-SIG-B information bit is 24 bit and MCS of STA1/2/3 is MCS0, MCS1, and MCS3, if HE-SIG-B is configured in a units of a symbol and HE-SIG-B for one STA is transmitted in one or more symbols, as described above, padding may be attached to configure three symbols but, when information of STAs using the same MCS is grouped and is delivered in one symbol, overhead of padding may be reduced and a difference of HE-SIG-B lengths according to the number of STA of an independent channel may be reduced.

In the aforementioned example, HE-SIG-B information of a plurality of STAs may be delivered in units of one symbol and/or symbols using various MCSs in one symbol as well as a method of grouping STAs with the same MCS. For example, when HE-SIG-B is transmitted to a 1× symbol structure (e.g. 48 tone) using information of 24 bit, information of an STA with MCS having the following combination may be delivered in one symbol.

(i) MCS0
(ii) MCS1, MCS1
(iii) MCS1, MCS3,MCS3

For example, when the number of STAs allocated per 20 MHz in a bandwidth of 80 MHz is even and uneven, overhead may be calculated as follows. In this case, it is assumed that the minimum number of STAs per 20 MHz is 1 and the maximum number of STAs is 9.

TABLE 3

| | # of allocation | | | | |
|---|---|---|---|---|---|
| | 4 | 8 | | 16 | |
| distribution | Even/uneven | Even | Uneven | Even | Uneven |
| Scenario 1 | 1.24 | 1.50 | 2.43 | 2.87 | 3.54 |
| Scenario 2 | 1.03 | 1.08 | 2.06 | 2.12 | 3.07 |
| Scenario 3 | 1.05 | 1.11 | 2.11 | 2.18 | 3.12 |

Even if individual coding is used as shown in Table 3 above, HE-SIG-B is transmitted using various MCSs, i.e., high MCS according to SNR of an STA and, thus, it may be seen from the above result that a difference of HE-SIG-B lengths per 20 MHz according to the number of STAs is not high. That is, to match alignment of HE-SIG-B, it may be seen that many symbols may not be required and complexity is not high.

In the aforementioned embodiment, differently from a method of independently transmitting HE-SIG-B per 20 MHz, HE-SIG-B may be transmitted using the following method in a channel of 40/80 MHz to gain duplication gain in a wideband width.

(A) Within a bandwidth of 40 MHz, independent HE-SIG-B per 20 MHz channel may be delivered using individual coding and, in this case, HE-SIG-B of 40 MHz may be duplicated.

(B) Within a bandwidth of 40 MHz, independent HE-SIG-B per 20 MHz channel may be delivered using group unit encoding, in this case, HE-SIG-B may be duplicated in units of 40 MHz.

The aforementioned method may be used to achieve performance gain through duplication gain of HE-SIG-B and to simultaneously acquire overhead reduction gain using individual coding/group coding.

The method proposed to independently transmit HE-SIG-B per 20 MHz may be applied in the same way to transmit HE-SIG-B.

(4) Fourth Embodiment—(Structure of FIG. 21)+Individual Encoding

Performance may be degraded due to channel interference in the case of transmission using a full bandwidth. Accordingly, to reduce influence of interference and to acquire duplication gain, HE-SIG-B may be transmitted using the following method in a wide bandwidth, e.g., a band of 80 MHz.

Figure 27:
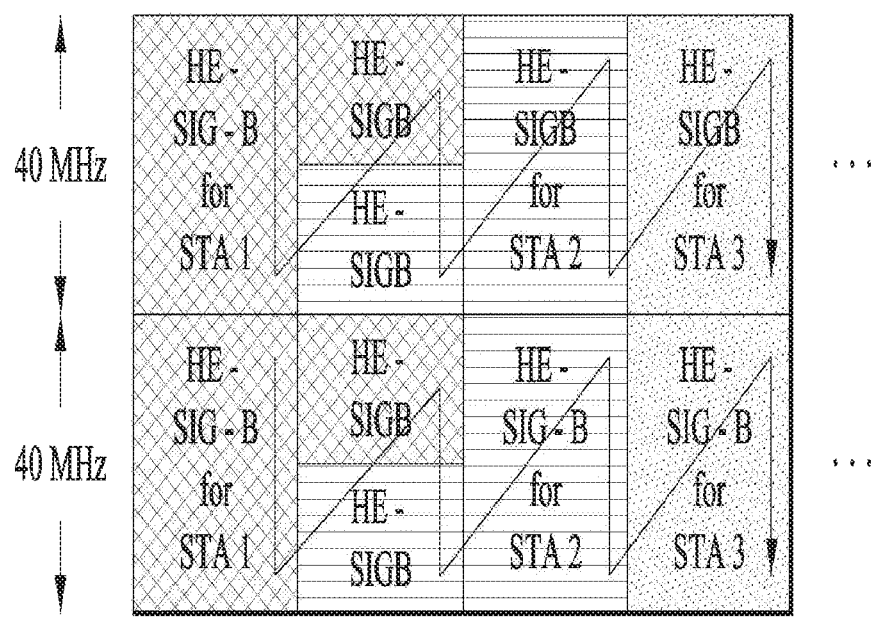
FIG. 27 is a diagram for explanation of a method of transmitting HE SIG B using a whole bandwidth according to another embodiment of the present invention.

FIG. 27 is a diagram for explanation of a method of transmitting HE SIG B using a whole bandwidth according to another embodiment of the present invention.

In an example of FIG. 27, HE-SIG-B may be transmitted in units of 40 MHz channels and, in this case, HE-SIG-B information may be delivered using a full bandwidth. In this case, information that is individually encoded for each STA may be delivered in a structure shown in FIG. 27.

Information of HE-SIG-B in FIG. 27 may be delivered in a frequency domain in a unit of a symbol and, in this case, information of a plurality of STAs may be delivered in one symbol to match a length of information corresponding to the frequency part and a length of the other part may be matched using padding.

In the aforementioned example, a length of HE-SIG-B information of STAs using a plurality of MCSs may be reduced or increased to deliver HE-SIG-B information of a plurality of STAs in one symbol.

User specific information of STAs in a 40 MHz channel may be delivered in another 40 MHz channel in a manner of duplication, to acquire duplication gain or an independent HE-SIG-B may be transmitted to another 40 MHz channel using individual encoding.

In the aforementioned example, HE-SIG-B for transmitting common information may be configured using a full bandwidth of 40 MHz and, in this case, may be configured in a first symbol or one symbol or may be configured using a predetermined carrier part of one symbol.

Information on transmission of the common HE-SIG-B may be transmitted through HE-SIG-A. The information of common HE-SIG-B transmitted through HE-SIG-A may include MCS, length of symbol, size, CP length, and so on. MCS information of HE-SIG-B transmitted through HE-SIG-A may be configured to include one or more of MCS information of common HE-SIG-B and user specific HE-SIG-B. MCS of the common HE-SIG-B may be various MCSs according to SNR/SINR of an STA and, in this case, may include low MCS (ex. MCS0 and MCS10) to ensure reliability and may be fixed to low MCS (ex. MCS0 and MCS10) with most robust performance.

HE-SIG-B common information for transmitting common information to STAs and HE-SIG-B specific information for transmitting user specific information may be transmitted using different MCSs. MCS for the common HE-SIG-B may be configured as the same MCS as HE-SIG-A including the common information.

A transmission method when HE-SIG B is transmitted through 160 MHz may be used by extending the aforementioned methods applied to 40/80 MHz.

HE-SIG-B may be transmitted using various methods using different proposed methods for respective channel bandwidths.

For example, HE-SIG-B may be transmitted using a group coding method in a bandwidth of 20 MHz, independent HE-SIG-B per 20 MHz channel may be delivered in a bandwidth of 40 MHz using group coding, 40 MHz information may be configured to be duplicated in 80 MHz as described above, and 80 MHz information may be transmitted to be duplicated in 160 MHz as described above.

Figure 28:
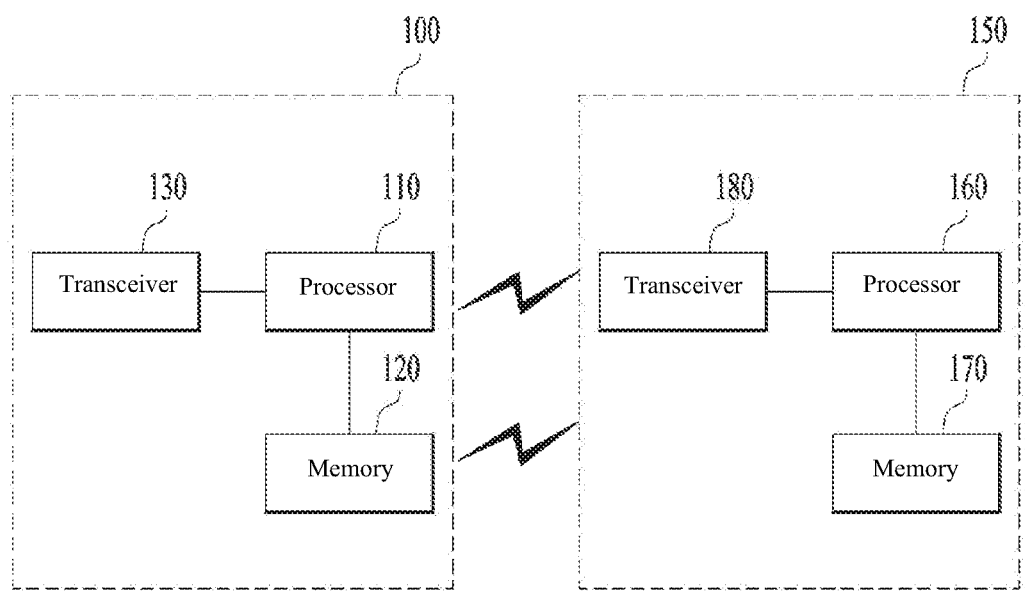
FIG. 28 is a block diagram illustrating exemplary configurations of an AP (or Base Station (BS)) and an STA (or User Equipment (UE)) according to an embodiment of the present invention.

FIG. 28 is a block diagram illustrating an exemplary structure of an AP (or BS) and an STA (or UE) according to an embodiment of the present invention.

An AP 100 may include a processor 110, a memory 120, and a transceiver 130. An STA 150 may include a processor 160, a memory 170, and a transceiver 180.

The transceivers 130 and 180 may transmit and receive wireless signals, for example, implement the Physical (PHY) layer in an IEEE 802 system. The processors 110 and 160 may be connected to the transceivers 130 and 180, and implement the PHY layer and/or the MAC layer in the IEEE 802 system. The processors 110 and 160 may be configured to perform one or a combination of two or more of the foregoing various embodiments of the present invention. Further, modules that perform AP and STA operations according to the foregoing various embodiments of the present invention may be stored in the memories 120 and 170 and executed by the processors 110 and 160. The memories 120 and 170 may be included inside the processors 110 and 160, or may be installed outside the processors 110 and 160 and connected to the processors 110 and 160 by known means.

The above descriptions of the AP 100 and the STA 150 are applicable to a BS and a UE, respectively in other wireless communication systems (e.g., an LTE/LTE-A system).

The above specific configurations of an AP and an STA may be implemented in such a manner that the various embodiments of the present invention may be implemented independently or simultaneously in a combination of two or more of them. Redundant descriptions will not be provided herein, for clarity.

Figure 29:
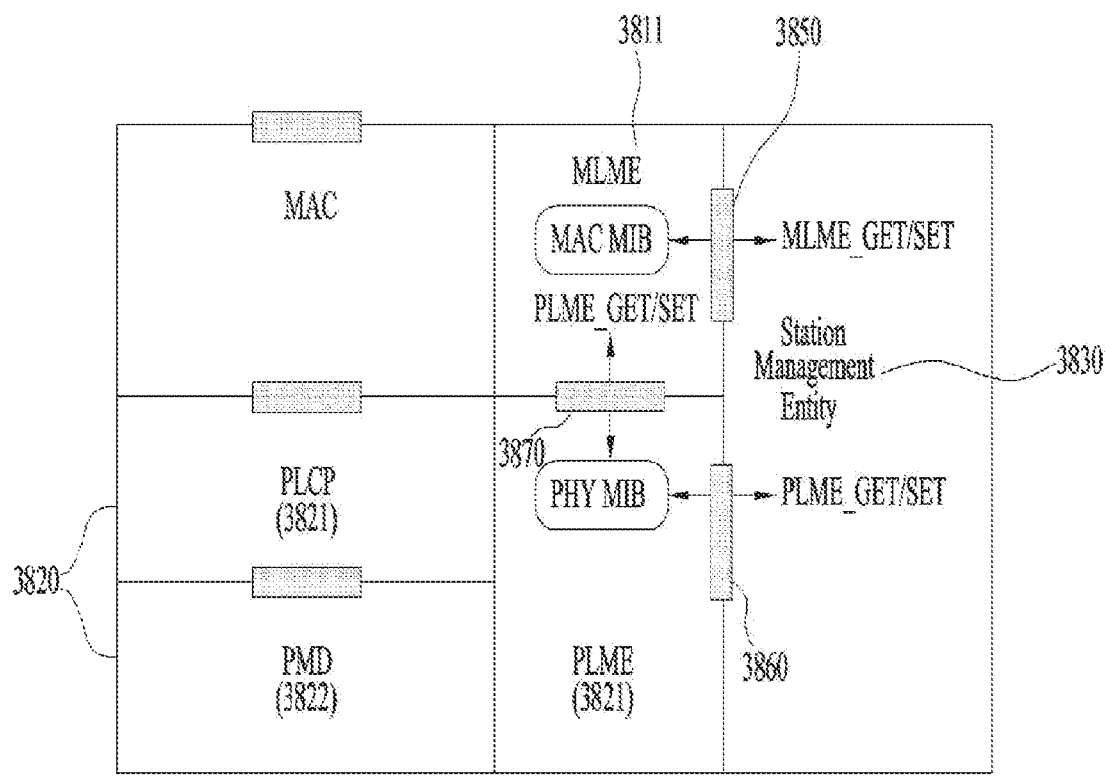
FIG. 29 is a view illustrating an exemplary structure of a processor in an AP or STA according to an embodiment of the present invention.

FIG. 29 is a view illustrating an exemplary structure of a processor in an AP or STA according to an embodiment of the present invention.

The processor of the AP or STA may have a multi-layered structure. FIG. 29 focuses on a MAC sublayer 3810 of a Data Link Layer (DLL) and a PHY layer 3820 among a plurality of layers. Referring to FIG. 28, the PHY layer 3820 may include a PLCP entity 3821, and a Physical Medium Dependent (PMD) entity 3822. Each of the MAC sublayer 3810 and the PHY layer 3820 includes a management entity conceptually called MAC sublayer Management Entity (MLME) 3811. These entities 3811 and 3821 provide layer management service interfaces through which layer management functions may be invoked.

In order to provide a correct MAC operation, a Station Management Entity (SME) 3830 is present in each STA. The SME 3830 is a layer-independent entity that may be viewed as residing in a separate management plane or as residing off to the side. The exact functions of the SME 3830 are not specified herein, but in general, this entity may be viewed as being responsible for such functions as gathering of information about layer-dependent statuses from various Layer Management Entities (LMEs) and similar setting of the values of layer-specific parameters. The SME 3830 may typically perform such functions on behalf of general system management entities and may implement standard management protocols.

The entities illustrated in FIG. 28 interact with one another in various ways. FIG. 28 illustrates a couple of examples of exchanging GET/SET primitives. An XX-GET.request primitive is used to request the value of a given Management Information Base (MIB) attribute. An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET. confirm primitive confirms that an indicated MIB attribute was set to a requested value, if Status is set to "success," and otherwise, it returns an error condition in the Status field. If this MIB attribute implies a specific action, then this confirms that the action was performed.

As illustrated in FIG. 29, the MLME 381 and the SME 3830 may exchange various MLME_GET/SET primitives via an MLME Service Access Point (MLME_SAP) 3850. Also, various PLCM_GET/SET primitives may be exchanged between the PLME 3821 and the SME 3830 via a PLME_SAP 3860 and between the MLME 3811 and the PLME 3870 via an MLME-PLME_SAP 3870.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In a firmware or software configuration, the method according to the embodiments of the present invention may be implemented in the form of modules, procedures, functions, or the like that perform the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. While the preferred embodiments of the present disclosure have been illustrated and described, the present disclosure is not limited to the foregoing specific embodiments, and those skilled in the art can make various modifications within the scope and spirit of the present disclosure claimed in the appended claims. Further, these modified embodiments should not be understood individually from the technical spirit or perspective of the present disclosure.

Both a product invention and a process invention are described in the present disclosure, and the descriptions of the inventions may be applied complementarily, when needed.

INDUSTRIAL APPLICABILITY

As described before, the embodiments of the present invention are applicable to various wireless communication systems including an IEEE 802.11 system.

What is claimed is:

1. A method of transmitting a radio frame to one or more stations (STAs) by an access point (AP) in a wireless local area network (LAN) system, the method comprising:

generating, by the AP, a frame including a signaling field and a data field, wherein the signaling field includes a signaling A field (SIG A field) comprising first common control information of the one or more STAs and a signaling B field (SIG B field) comprising individual control information of each of the one or more STAs, wherein the SIG B field includes a common field comprising second common control information of the one or more STAs and an individual field comprising the individual control information of the one or more STAs; and transmitting the frame to the one or more STAs, wherein, when the frame is transmitted in a bandwidth of 40 MHz or more, the SIG B field is transmitted in each of a first 20 MHz band and a second 20 MHz band which are continuous with each other, wherein the SIG B field transmitted in the first 20 MHz band includes control information for a resource region different from the SIG B field transmitted in the second 20 MHz band, wherein the SIG B field transmitted in the first 20 MHz band and the SIG B field transmitted in the second 20 MHz band are encoded separately from each other, wherein, when the frame is transmitted in a bandwidth of 80 MHz or more, the SIG B field is transmitted in each of the first 20 MHz band, the second 20 MHz band, a third 20 MHz band, and a fourth 20 MHz band, wherein the SIG B field transmitted in the third 20 MHz band includes the same resource allocation information as that of the SIG B field transmitted in the first 20 MHz band, and wherein the SIG B field transmitted in the fourth 20 MHz band includes control information identical to that of the SIG B field transmitted in the second 20 MHz band.

2. The method according to claim 1, wherein the individual field of the SIG B field transmitted in each of the first 20 MHz band and the second 20 MHz band comprise a padding bit after cyclic redundancy check (CRC) of the individual control information and a tail bit.

3. The method according to claim 1, wherein the one or more STAs comprises a plurality of STAs; and
wherein the individual field of the SIG B field comprises information encoded by grouping information for two or more STAs of the plurality of STAs.

4. The method according to claim 3, wherein the information for the two or more STAs comprises cyclic redundancy check (CRC) in units of the grouping information.

5. The method according to claim 3, wherein the grouping for encoding is performed in consideration of modulation and coding scheme (MCS) of each of the plurality of STAs.

6. The method according to claim 5, wherein the individual field of the SIG B field is configured by grouping and encoding STAs with a same MCS among the plurality of STAs.

7. An access point (AP) apparatus for transmitting a radio frame to one or more stations (STAs) in a wireless local area network (LAN) system, the AP apparatus comprising:
a processor configured to generate a frame including a signaling field and a data field; and
a transceiver connected to the processor and configured to transmit the frame to the one or more STAs,
wherein the processor configures the signaling field to include a first signaling field (SIG A field) comprising first common control information of the one or more STAs and a second signaling field (SIG B field) comprising individual control information of each of the one or more STAs, configures the second signaling field to include a common field comprising second common control information of the one or more STAs and an individual field comprising the individual control information of the one or more STAs, wherein, when the frame is transmitted in a bandwidth of 40 MHz or more, the SIG B field is transmitted in each of a first 20 MHz band and a second 20 MHz band which are continuous with each other, wherein the SIG B field transmitted in the first 20 MHz band includes control information for a resource region different from the SIG B field transmitted in the second 20 MHz band, wherein the SIG B field transmitted in the first 20 MHz band and the SIG B field transmitted in the second 20 MHz band are encoded separately from each other, wherein, when the frame is transmitted in a bandwidth of 80 MHz or more, the SIG B field is transmitted in each of the first 20 MHz band, the second 20 MHz band, a third 20 MHz band, and a fourth 20 MHz band, wherein the SIG B field transmitted in the third 20 MHz band includes the same resource allocation information as that of the SIG B field transmitted in the first 20 MHz band, and wherein the SIG B field transmitted in the fourth 20 MHz band includes control information identical to that of the SIG B field transmitted in the second 20 MHz band.

8. The AP apparatus according to claim 7, wherein the processor configures the individual field of the SIG B field transmitted in each of the first 20 MHz band and the second 20 MHz band to include a padding bit after cyclic redundancy check (CRC) of the individual control information and a tail bit.

9. The AP apparatus according to claim 7, wherein the one or more STAs comprises a plurality of STAs; and
wherein the processor configures the individual field of the SIG B field to include information encoded by grouping information for two or more STAs of the plurality of STAs.

10. The AP apparatus according to claim 8, wherein the information for the two or more STAs comprises cyclic redundancy check (CRC) in units of grouping information.

* * * * *